US011390356B2

(12) United States Patent
Komada et al.

(10) Patent No.: US 11,390,356 B2
(45) Date of Patent: Jul. 19, 2022

(54) ELECTRIC CONNECTOR DEVICE AND ELECTRIC DEVICE FOR HUMAN-POWERED VEHICLE

(71) Applicant: SHIMANO INC., Sakai (JP)

(72) Inventors: Yasuyuki Komada, Sakai (JP); Kohei Obuchi, Sakai (JP); Yuichiro Hidaka, Sakai (JP); Hirohisa Toyoshima, Sakai (JP); Eiji Mishima, Sakai (JP); Ryo Yamazaki, Sakai (JP); Norihisa Senoo, Sakai (JP); Noor Ashyikkin Binti Mohd Noor, Sakai (JP); Takaya Masuda, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 16/864,165

(22) Filed: May 1, 2020

(65) Prior Publication Data

US 2021/0339823 A1    Nov. 4, 2021

(51) Int. Cl.
| | |
|---|---|
| *B62M 6/45* | (2010.01) |
| *H01R 13/627* | (2006.01) |
| *H01R 13/59* | (2006.01) |
| *H01R 13/506* | (2006.01) |

(52) U.S. Cl.
CPC ............. *B62M 6/45* (2013.01); *H01R 13/506* (2013.01); *H01R 13/59* (2013.01); *H01R 13/627* (2013.01)

(58) Field of Classification Search
CPC ...... B62M 6/45; H01R 13/506; H01R 13/512; H01R 13/585; H01R 13/59; H01R 13/595; H01R 13/621; H01R 13/627
See application file for complete search history.

(56) References Cited

U.S. PATENT DOCUMENTS

| | | | |
|---|---|---|---|
| 6,073,730 A | 6/2000 | Abe | |
| 7,760,078 B2 | 7/2010 | Miki et al. | |
| 7,850,556 B2 | 12/2010 | Meggiolan | |
| (Continued) | | | |

FOREIGN PATENT DOCUMENTS

| | | |
|---|---|---|
| CN | 1202437 | 12/1998 |
| CN | 107303934 | 10/2017 |
| (Continued) | | |

OTHER PUBLICATIONS

Define electrical contact, Google Search, May 7, 2021 (Year: 2021).
(Continued)

*Primary Examiner* — Oscar C Jimenez
(74) *Attorney, Agent, or Firm* — Mori & Ward, LLP

(57) ABSTRACT

An electric connector device for a human-powered vehicle comprises a connector base and a coupling structure. The connector base includes a first connection port and a second connection port. The first connection port defines a first center axis. The second connection port defines a second center axis. The second center axis is spaced apart from the first center axis as viewed in a predetermined direction. The coupling structure is configured to detachably attach the connector base to an additional device so that the connector base is non-movably attached to the additional device. The coupling structure is provided between the first center axis and the second center axis as viewed in the predetermined direction.

24 Claims, 21 Drawing Sheets

(56) References Cited

U.S. PATENT DOCUMENTS

| | | |
|---|---|---|
| 9,434,437 B2* | 9/2016 | Van Dyke ................ B60Q 3/14 |
| 10,486,658 B2 | 11/2019 | Komatsu et al. |
| 2003/0032327 A1* | 2/2003 | LaBonte ................ B62K 11/14 439/527 |
| 2008/0210046 A1 | 9/2008 | De Perini |
| 2009/0315692 A1 | 12/2009 | Miki et al. |
| 2012/0096978 A1 | 4/2012 | Voshell et al. |
| 2014/0102237 A1 | 4/2014 | Jordan et al. |
| 2014/0352478 A1 | 12/2014 | Gao |
| 2016/0311499 A1 | 10/2016 | Kasai |
| 2017/0080993 A1 | 3/2017 | Bierwerth et al. |
| 2017/0305395 A1 | 10/2017 | Komatsu et al. |
| 2018/0001960 A1 | 1/2018 | Pasqua |
| 2018/0057102 A1 | 3/2018 | Komatsu et al. |
| 2018/0057103 A1 | 3/2018 | Komatsu et al. |
| 2018/0057104 A1 | 3/2018 | Komatsu et al. |
| 2019/0002057 A1 | 1/2019 | Jordan et al. |
| 2019/0185109 A1 | 6/2019 | Howell-McLean et al. |
| 2019/0210691 A1 | 7/2019 | Cahan et al. |
| 2019/0382074 A1 | 12/2019 | Bierwerth et al. |
| 2019/0382081 A1 | 12/2019 | Bierwerth et al. |
| 2021/0139102 A1 | 5/2021 | Komada et al. |
| 2021/0144453 A1 | 5/2021 | Komada et al. |

FOREIGN PATENT DOCUMENTS

| | | |
|---|---|---|
| CN | 107776814 | 3/2018 |
| DE | 102016010801 | 3/2017 |
| DE | 10 2018 009 621 | 7/2019 |
| DE | 10 2019 004 154 | 12/2019 |
| TW | I667169 B | 8/2019 |

OTHER PUBLICATIONS

Office Action with Form PTO-892 Notice of References Cited issued by the United States Patent and Trademark Office for the co-pending U.S. Appl. No. 16/950,829, filed May 12, 2021.

Office Action with Form PTO-892 Notice of References Cited issued by the United States Patent and Trademark Office for the co-pending U.S. Appl. No. 16/683,212, filed Jul. 15, 2021.

Office Action with Form PTO-892 Notice of References Cited issued by the United States Patent and Trademark Office for the co-pending U.S. Appl. No. 16/683,212, filed Feb. 8, 2021.

Define plane, Google Search, Nov. 17, 2021.

Definition of plane, merriam-webster.com, Nov. 16, 2021.

Definition of area, merriam-webster.com, Nov. 16, 2021.

Define reference plane, Google Search, Nov. 16, 2021.

Office Action with Form PTO-892 Notice of References Cited issued by the United States Patent and Trademark Office for the co-pending U.S. Appl. No. 16/683,206, filed Nov. 22, 2021.

Office Action with Form PTO-692 Notice of References Cited issued by the united States Patent and Trademark Office for the co-pending U.S. Appl. No. 16/683,200, filed Dec. 9, 2021.

"Vuka Shift AXS User Manual", SRAM, LLC., 2020.

Office Action with Form PTO-892 Notice of References Cited issued by the United States Patent and Trademark Office for the co-pending U.S. Appl. No. 16/683,212, filed Feb. 9, 2022.

* cited by examiner

ELECTRIC CONNECTOR DEVICE AND ELECTRIC DEVICE FOR HUMAN-POWERED VEHICLE

BACKGROUND OF THE INVENTION

Field of the Invention

The present invention relates to an electric connector device and an electric device for a human-powered vehicle.

Discussion of the Background

A human-powered vehicle includes an electric unit configured to operate another unit.

SUMMARY OF THE INVENTION

In accordance with a first aspect of the present invention, an electric connector device for a human-powered vehicle comprises a connector base and a coupling structure. The connector base includes a first connection port and a second connection port. The first connection port defines a first center axis. The second connection port defines a second center axis. The second center axis is spaced apart from the first center axis as viewed in a predetermined direction. The coupling structure is configured to detachably attach the connector base to an additional device so that the connector base is non-movably attached to the additional device. The coupling structure is provided between the first center axis and the second center axis as viewed in the predetermined direction.

With the electric connector device according to the first aspect, the coupling structure can reduce force applied to an electric connection cable installed in the connector base when an electric control cable is inserted into and/or removed from the first or second connection port. Thus, it is possible to easily connect and/or disconnect the electric control cable to and/or from the first and/or second connection port. Furthermore, it is possible to utilize an area provided between the first center axis and the second center axis for the coupling structure. Accordingly, it is possible to improve usability of the electric connector device while suppressing increase in size of the electric connector device caused by the coupling structure.

In accordance with a second aspect of the present invention, an electric connector device for a human-powered vehicle comprises a connector base and a coupling structure. The coupling structure is configured to detachably attach the connector base to an additional device so that the connector base is non-movably attached to the additional device, the additional device including an operating member.

With the electric connector device according to the second aspect, the coupling structure can reduce force applied to an electric connection cable installed in the connector base when an electric control cable is inserted into and/or removed from a connection port of the connector base. Thus, it is possible to easily connect and/or disconnect the electric control cable to and/or from the connection port. Accordingly, it is possible to improve usability of the electric connector device.

In accordance with a third aspect of the present invention, the electric connector device according to the second aspect is configured so that the connector base includes a first connection port defining a first center axis and a second connection port defining a second center axis. The second center axis is spaced apart from the first center axis as viewed in a predetermined direction.

With the electric connector device according to the third aspect, it is possible to easily connect and/or disconnect the electric control cable to and/or from the first and/or second connection port.

In accordance with a fourth aspect of the present invention, the electric connector device according to any one of the first to third aspects is configured so that the coupling structure includes a coupling member configured to attach the connector base to the additional device. The coupling member is a separate member from the connector base. The coupling member is provided between the first center axis and the second center axis as viewed in the predetermined direction.

With the electric connector device according to the fourth aspect, it is possible to utilize an area provided between the first center axis and the second center axis for the coupling member of the coupling structure. Accordingly, it is possible to suppress increase in size of the electric connector device caused by the coupling structure.

In accordance with a fifth aspect of the present invention, the electric connector device according to the fourth aspect is configured so that the coupling member includes a first coupling member and a second coupling member. The first coupling member is configured to detachably attach the connector base to the additional device. The second coupling member is configured to detachably attach the connector base to the additional device. The second coupling member is separate from the first coupling member. At least one of the first coupling member and the second coupling member is provided between the first center axis and the second center axis as viewed in the predetermined direction.

With the electric connector device according to the fifth aspect, it is possible to improve coupling strength between the connector base and the additional device while suppressing increase in size of the electric connector device caused by the coupling structure.

In accordance with a sixth aspect of the present invention, the electric connector device according to the fifth aspect is configured so that both of the first coupling member and the second coupling member are provided between the first center axis and the second center axis as viewed in the predetermined direction.

With the electric connector device according to the sixth aspect, it is possible to reliably suppress increase in size of the electric connector device caused by the coupling structure.

In accordance with a seventh aspect of the present invention, the electric connector device according to the fifth or sixth aspect is configured so that at least one of the first coupling member and the second coupling member includes an external thread configured to be threadedly engaged with the additional device.

With the electric connector device according to the seventh aspect, it is possible to recognize the structure in which the connector base is detachably attached to the additional device.

In accordance with an eighth aspect of the present invention, the electric connector device according to any one of the fifth to seventh aspects is configured so that at least one of the first coupling member and the second coupling member extends in the predetermined direction.

With the electric connector device according to the eighth aspect, it is possible to suppress increase in an area of the coupling structure as viewed in the predetermined direction.

In accordance with a ninth aspect of the present invention, the electric connector device according to any one of the fifth to eighth aspects is configured so that the coupling structure includes an opening disposed on the connector base and provided between the first center axis and the second center axis as viewed in the predetermined direction. The first coupling member and the second coupling member are configured to extend through the opening in an attaching state where the coupling member attaches the connector base to the additional device.

With the electric connector device according to the ninth aspect, it is possible to reliably recognize the structure in which the connector base is detachably attached to the additional device.

In accordance with a tenth aspect of the present invention, the electric connector device according to the ninth aspect is configured so that the additional device includes a protrusion to which the first coupling member and the second coupling member are coupled. The protrusion is configured to extend through the opening in the attaching state.

With the electric connector device according to the tenth aspect, it is possible to easily position the connector base relative to the additional device.

In accordance with an eleventh aspect of the present invention, the electric connector device according to the tenth aspect is configured so that the opening includes a first opening and a second opening. The protrusion includes a first protrusion and a second protrusion. The first protrusion is configured to extend through the first opening in the attaching state. The second protrusion is configured to extend through the second opening in the attaching state. The first coupling member and the second coupling member are coupled to the first protrusion and the second protrusion respectively in the attaching state.

With the electric connector device according to the eleventh aspect, it is possible to reliably recognize the structure in which the connector base is detachably attached to the additional device.

In accordance with a twelfth aspect of the present invention, the electric connector device according to the fourth aspect is configured so that the coupling structure includes an intermediate plate configured to be provided between the connector base and the coupling member.

With the electric connector device according to the twelfth aspect, it is possible to improve coupling strength between the connector base and the additional device.

In accordance with a thirteenth aspect of the present invention, the electric connector device according to the twelfth aspect is configured so that the connector base includes a recess. The intermediate plate is configured to be provided in the recess.

With the electric connector device according to the thirteenth aspect, it is possible to suppress increase in size of the electric connector device in the predetermined direction.

In accordance with a fourteenth aspect of the present invention, the electric connector device according to the twelfth aspect is configured so that the recess extends along at least one of the first center axis and the second center axis as viewed in the predetermined direction.

With the electric connector device according to the fourteenth aspect, it is possible to effectively utilize an area provided between the first center axis and the second center axis as viewed in the predetermined direction.

In accordance with a fifteenth aspect of the present invention, the electric connector device according to any one of the first to third aspects is configured so that the coupling structure includes an engagement member provided on the connector base to be snap-fitted with an additional engagement member of the additional device.

With the electric connector device according to the fifteenth aspect, it is possible to easily attach the connector base to the additional device using the engagement member.

In accordance with a sixteenth aspect of the present invention, the electric connector device according to the fifteenth aspect is configured so that the engagement member is configured to be elastically deformable so as to be snap-fitted with the additional engagement member.

With the electric connector device according to the sixteenth aspect, it is possible to easily detach the connector base from the additional device using the engagement member.

In accordance with a seventeenth aspect of the present invention, the electric connector device according to any one of the first to sixteenth aspects is configured so that the first center axis is parallel to the second center axis as viewed in the predetermined direction.

With the electric connector device according to the seventeenth aspect, it is possible to ensure the area provided between the first center axis and the second center axis.

In accordance with an eighteenth aspect of the present invention, the electric connector device according to the first to seventeenth aspects is configured so that at least one of the first center axis and the second center axis is perpendicular to the predetermined direction.

With the electric connector device according to the eighteenth aspect, it is possible to ensure the area provided between the first center axis and the second center axis.

In accordance with a nineteenth aspect of the present invention, an electric device for a human-powered vehicle comprises a base member, a movable member, circuitry, a wireless antenna, and a power-supply holder. The movable member is movably coupled to the base member. The circuitry has a first side and a second side provided on a reverse side of the first side. The circuitry is provided at one of the base member and the movable member. The wireless antenna is provided to the first side of the circuitry. The power-supply holder is configured to accommodate a power supply. The power-supply holder is provided to the first side of the circuitry in a predetermined range equal to or longer than 3 mm with respect to the wireless antenna.

With the electric device according to the nineteenth aspect, it is possible to reduce interference between the power supply and radio wave of the wireless antenna.

In accordance with a twentieth aspect of the present invention, the electric device according to the nineteenth aspect is configured so that the base member extends in a longitudinal direction. The base member includes a first end portion, a second end portion, and a grip portion. The first end portion is configured to be coupled to a handlebar. The second end portion is opposite to the first end portion in the longitudinal direction. The grip portion is provided between the first end portion and the second end portion. The movable member is pivotally coupled to the base member about a pivot axis provided closer to the second end portion than to the first end portion. At least one of the wireless antenna and the power-supply holder is provided to the second end portion.

With the electric device according to the twentieth aspect, it is possible to utilizes the second end portion as a place for the power-supply holder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
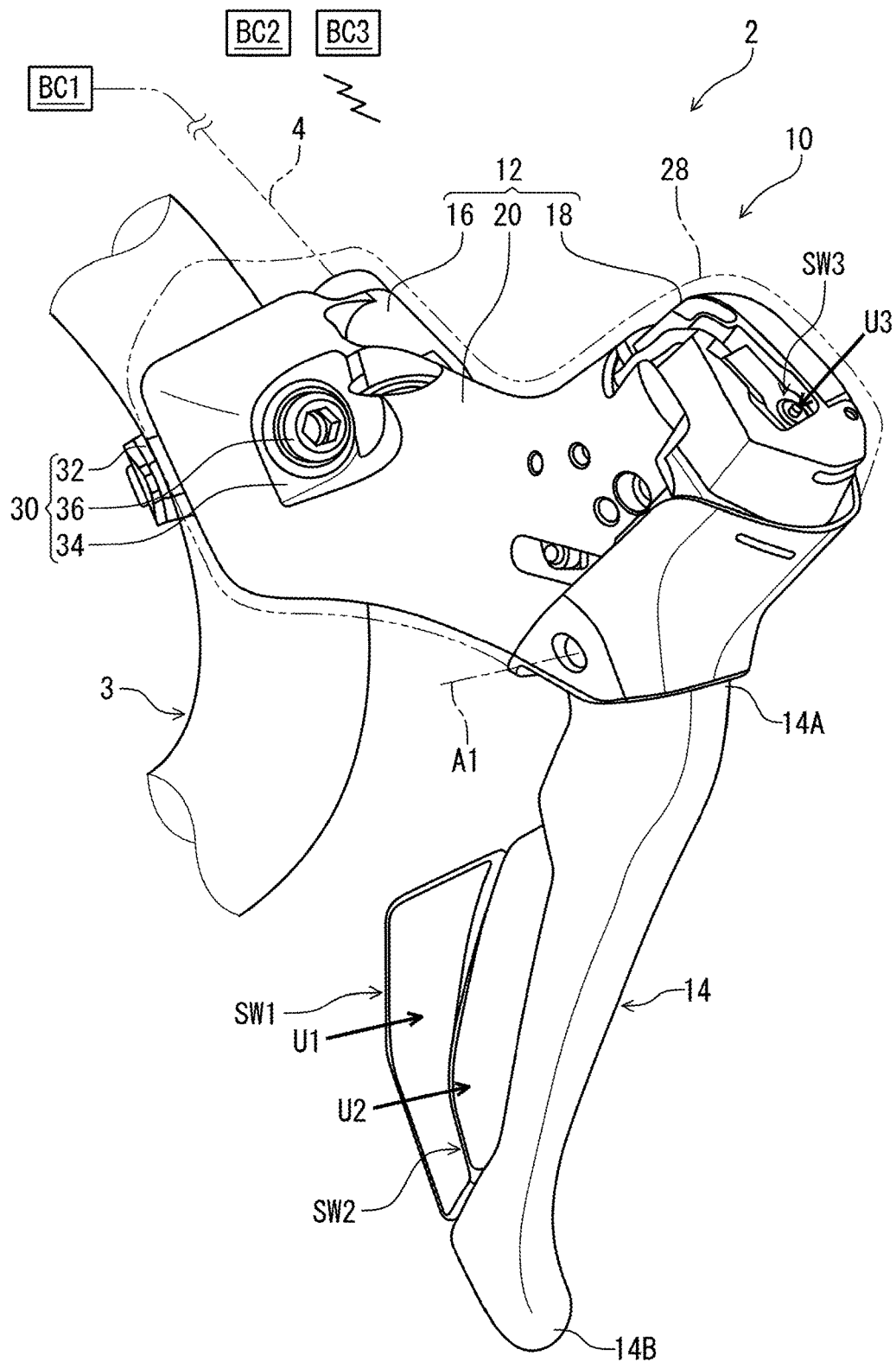
FIG. 1 is a perspective view of an electric device in accordance with an embodiment.

The embodiment(s) will now be described with reference to the accompanying drawings, wherein like reference numerals designate corresponding or identical elements throughout the various drawings.

As seen in FIG. 1, an electric device 10 for a human-powered vehicle 2 is configured to be mounted to a handlebar 3. In the present embodiment, the electric device 10 is configured to be mounted to a drop-down handlebar. The electric device 10 includes an operating device configured to operate another device. However, structures of the electric device 10 can be applied to other operating devices mounted to other type of handlebars such as a flat handlebar, a time trial handlebar, and a bull horn handlebar. The electric device 10 can include devices other than the operating device.

For example, the human-powered vehicle 2 is a vehicle to travel with a motive power including at least a human power of a user who rides the human-powered vehicle 2 (i.e., rider). The human-powered vehicle 2 has an arbitrary number of wheels. For example, the human-powered vehicle 2 has at least one wheel. In the present embodiment, the human-powered vehicle 2 preferably has a smaller size than that of a four-wheeled automobile. However, the human-powered vehicle 2 can have an arbitrary size. For example, the human-powered vehicle 2 can have a larger size than that of the four-wheeled automobile. Examples of the human-powered vehicle 2 include a bicycle, a tricycle, and a kick scooter. In the present embodiment, the human-powered vehicle 2 is a bicycle. An electric assisting system including an electric motor can be applied to the human-powered vehicle 2 (e.g., the bicycle) to assist muscular motive power of the user. Namely, the human-powered vehicle 2 can be an E-bike.

The electric device 10 is operatively coupled to at least one device to operate the at least one device. In the present embodiment, the electric device 10 is operatively coupled to an operated device BC1 such as a brake device. The electric device 10 is operatively coupled to the operated device BC1 via a hydraulic hose 4. However, the electric device 10 can be operatively coupled to a mechanical component such as a brake device via a mechanical control cable including an inner wire. The operated device BC1 can include devices other than a brake device.

The electric device 10 is electrically connected to an electric component BC2 and an additional electric component BC3. In the present embodiment, the electric device 10 is wirelessly connected to the electric component BC2 and the additional electric component BC3. However, the electric device 10 can be connected to the electric component BC2 and the additional electric component BC3 via an electrical control cable.

Examples of the electric component BC2 and the additional electric component BC3 include an additional or satellite operating device, an adjustable seatpost, a suspension, a gear changing device, a brake device, a lighting device, and a display device. In the present embodiment, the electric component BC2 includes a gear shifting device such as a derailleur. The additional electric component BC3 includes an adjustable seatpost. However, the electric component BC2 and the additional electric component BC3 are not limited to the above devices.

In the present embodiment, the electric device 10 is a right-hand side operating/control device configured to be operated by the rider's right hand to actuate the operated device BC1. However, the structures of the electric device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or seat) in the human-powered vehicle 2 with facing the handlebar 3. Accordingly, these terms, as utilized to describe the electric device 10 or other components, should be interpreted relative to the human-powered vehicle 2 equipped with the electric device 10 as used in an upright riding position on a horizontal surface.

The electric device 10 comprises switches SW1, SW2, and SW3. The switch SW1 is configured to be activated in response to a user input U1. The switch SW2 is configured to be activated in response to a user input U2. The switch SW3 is configured to be activated in response to a user input U3. In the present embodiment, the electric component BC2 is configured to be operated in response to the user inputs U1 and U2 of the switches SW1 and SW2. The additional electric component BC3 is configured to be operated in response to the user input U3 of the switch SW3. For example, the electric component BC2 is configured to upshift and downshift in response to the user inputs U1 and U2 received by the switches SW1 and SW2. The additional electric component BC3 is configured to change a state of the additional electric component BC3 between a lock state and an adjustable state in response to the user input U3 received by the switch SW3. However, each of the switches SW1 to SW3 can be used to operate other devices.

Figure 2:
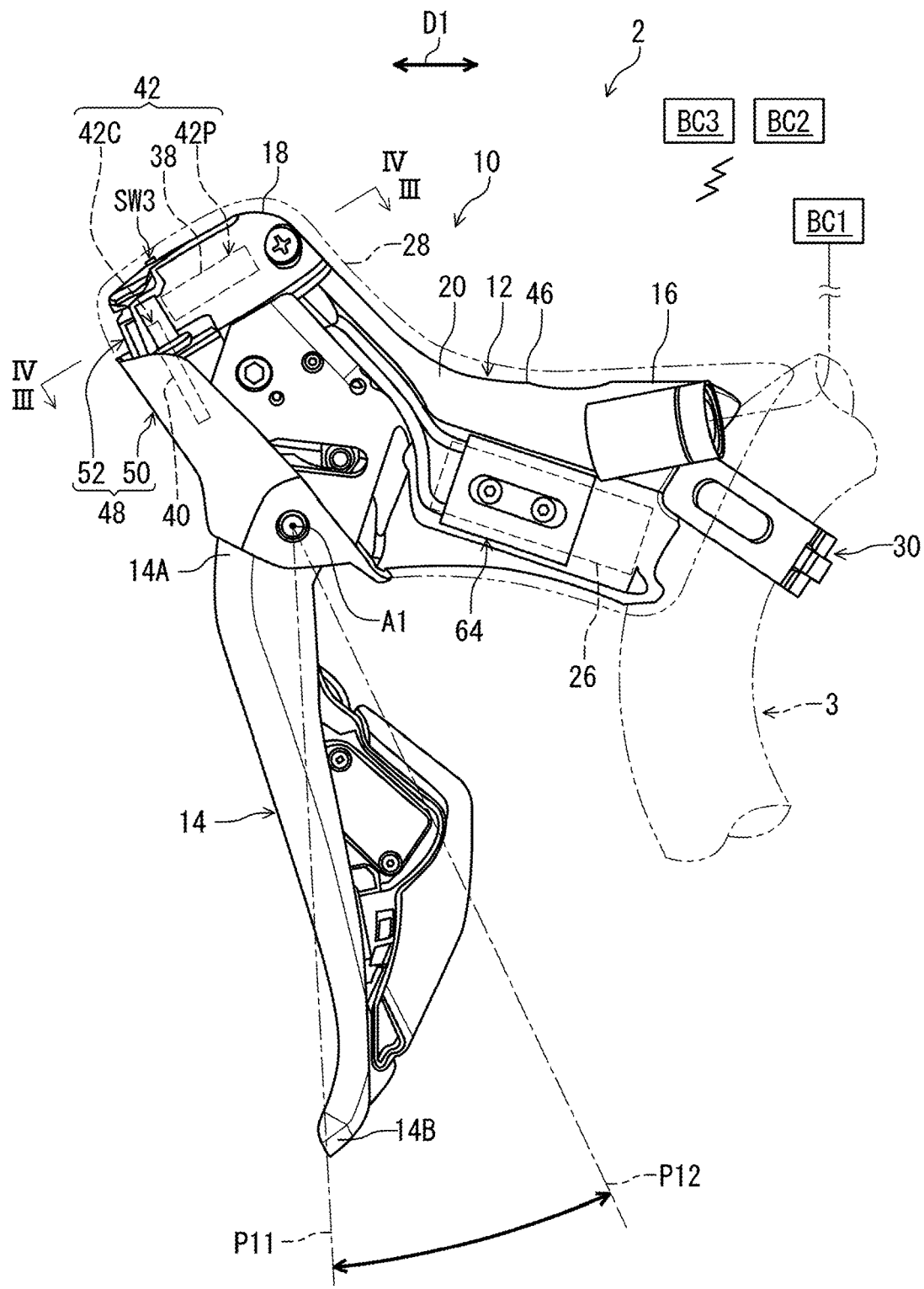
FIG. 2 is a side elevational view of the electric device illustrated in FIG. 1, with an electric connector device.

As seen in FIG. 2, the electric device 10 for the human-powered vehicle 2 comprises a base member 12 and a movable member 14. The base member 12 extends in a longitudinal direction D1 and includes a first end portion 16 and a second end portion 18. The first end portion 16 is configured to be coupled to the handlebar 3. The second end portion 18 is opposite to the first end portion 16 in the longitudinal direction D1. The second end portion 18 constitutes a free end portion of the base member 12. The base member 12 includes a grip portion 20 provided between the first end portion 16 and the second end portion 18. The grip portion 20 is provided between the first end portion 16 and the second end portion 18 in the longitudinal direction D1.

The movable member 14 is movably coupled to the base member 12. The movable member 14 is pivotally coupled to the base member 12 about a pivot axis A1. The movable member 14 is pivotable relative to the base member 12 about the pivot axis A1 between a rest position P11 and an operated position P12. The pivot axis A1 is provided closer to the second end portion 18 than to the first end portion 16. The movable member 14 includes a proximal end portion 14A and a distal end portion 14B opposite to the proximal end portion 14A. The movable member 14 extends from the proximal end portion 14A to the distal end portion 14B. The rest position P11 and the operated position P12 are defined by the pivot axis A1 and the distal end portion 14B. The proximal end portion 14A is closer to the pivot axis A1 than the distal end portion 14B. The movable member 14 is configured to be operated by the user. Thus, the movable member 14 can also be referred to as an operating member 14. The electric device 10 can also be referred to as an additional device 10. Namely, the additional device 10 includes the operating member 14. The additional device 10 includes an operating device including the operating member 14. However, the additional or electric device 10 can also be another electric device such as an indicating device, a satellite switch, a junction switch, a connector device, and an external device. For example, an electric connector device described later can be detachably attached to at least one of the operating device, the indicating device, the satellite switch, the junction switch, the connector device, and the external device. However, the additional or electric device 10 is not limited to the above examples.

In the present application, the term "rest position" as used herein refers to a position at which a movable part such as the movable member 14 remains stationary in a state where the movable part is not operated by the user. The term "operated position" as used herein refers to a position at which the movable part has been operated by the user to perform the operation of a device such as the operated device BC1.

The electric device 10 includes a hydraulic unit 26 provided in the base member 12. The hydraulic unit 26 is configured to generate hydraulic pressure in response to a movement of the operating member 14. For example, the hydraulic unit 26 includes a cylinder bore, a piston, and a reservoir. Since the hydraulic unit 26 includes structures which have been known, they will not be described in detail here for the sake of brevity. The operating member 14 can be operatively coupled to another structure instead of the hydraulic unit 26. For example, the operating member 14 can be operatively coupled to a mechanical control cable such as a Bowden cable so as to operate the operated device BC1.

The electric device 10 further comprises a grip cover 28. The grip cover 28 is configured to be attached to the base member 12 so as to at least partly cover the base member 12 in a state where the grip cover 28 is attached to the base member 12. For example, the grip cover 28 is made of a non-metallic material such as an elastic material. Examples of the elastic material include rubber. A rider sometimes grips the base member 12 (e.g., the grip portion 20) and leans on the base member 12 (e.g., the grip portion 20) through the grip cover 28 during riding. The grip cover 28 can be omitted from the electric device 10.

The switches SW1 and SW2 are mounted to the movable member 14 to be movable relative to the base member 12 along with the movable member 14. The switch SW3 is mounted to the base member 12. The switch SW3 is provided to the second end portion 18. The switch SW3 is provided between the base member 12 and the grip cover 28. The switch SW3 is configured to be operated by the user via the grip cover 28. However, the positions of the switches SW1, SW2, and SW3 are not limited to the present embodiment.

As seen in FIG. 1, the electric device 10 further comprises a mounting structure 30 configured to couple the first end portion 16 to the handlebar 3. The mounting structure 30 preferably includes a band clamp 32 and a tightening member 34. The tightening member 34 is configured to couple the band clamp 32 to the first end portion 16. The tightening member 34 includes a mounting bolt 36 so as to clamp the handlebar 3 between the band clamp 32 and the first end portion 16. The mounting structure 30 can include other structures which is similar to the band clamp 32 and which is used in a road shifter for mounting to a drop-down handlebar.

As seen in FIG. 2, the electric device 10 for the human-powered vehicle 2 comprises a power supply 38. The power supply 38 is provided at one of the base member 12 and the movable member 14. In the present embodiment, the power supply 38 is provided at the base member 12. The power supply 38 is provided at the second end portion 18. However, the power supply 38 can be provided at the movable member 14. The power supply 38 can be provided at portions other than the second end portion 18.

The electric device 10 for the human-powered vehicle 2 comprises circuitry 40. The circuitry 40 is provided at one of the base member 12 and the movable member 14. In the present embodiment, the circuitry 40 is provided at the base member 12. The circuitry 40 is provided at the second end portion 18. However, the circuitry 40 can be provided at the movable member 14. The circuitry 40 can be provided at portions other than the second end portion 18.

The power supply 38 is configured to supply electricity to the circuitry 40 and other components. Examples of the power supply 38 include a primary battery, a secondary battery, and a capacitor. For example, the power supply 38 includes a button cell shaped as a flat cylinder. However, the power supply 38 is not limited to the present embodiment.

The base member 12 includes an accommodating part 42. The accommodating part 42 is provided to the second end portion 18. The accommodating part 42 is configured to accommodate at least one of the power supply 38 and the circuitry 40. The accommodating part 42 is configured to accommodate the power supply 38 and the circuitry 40. Specifically, the accommodating part 42 includes a power-supply accommodating part 42P and a circuitry accommodating part 42C. The power-supply accommodating part 42P is configured to accommodate the power supply 38. The circuitry accommodating part 42C is configured to accommodate the circuitry 40. However, the accommodating part 42 can be configured to accommodate only one of the power supply 38 and the circuitry 40. One of the power-supply accommodating part 42P and the circuitry accommodating part 42C can be omitted from the accommodating part 42.

As seen in FIG. 2, the base member 12 includes a main body 46 and an attachment member 48 which is a separate member from the main body 46. The attachment member 48 is made of a first material different from the main body 46. The first material includes a resin material. The second material includes a resin material. Radio wave interference of the attachment member 48 is lower than radio wave interference of the main body 46. Radio wave interference of the first material is lower than radio wave interference of the second material. For example, the first material includes a glass fiber reinforced material. The main body 46 is made of a second material different from the first material. The second material includes a carbon fiber reinforced material. Namely, the attachment member 48 is a separate member from the main body 46. The glass fiber reinforced material includes grass fibers and a resin material such as synthetic resin. The carbon fiber reinforced material includes carbon fibers and a resin material such as synthetic resin. However, the first material and the second material are not limited to the present embodiment. The first material can be the same as the second material. The first material may include any robust material with radio wave interference equal to radio wave interference of the second material. The attachment member 48 is configured to be detachably attached to the main body 46. However, the attachment member 48 can be integrally provided with the main body 46 as a one-piece unitary member.

The term "detachable" or "detachably," as used herein, encompasses a configuration in which an element is repeatedly detachable from and attachable to another element without substantial damage.

The main body 46 includes the first end portion 16 and the grip portion 20. The attachment member 48 includes the second end portion 18. The attachment member 48 includes a first attachment member 50 and a second attachment member 52. The first attachment member 50 is a separate member from the second attachment member 52. The accommodating part 42 is provided in the attachment member 48. The circuitry accommodating part 42C is provided in the second attachment member 52. The power-supply accommodating part 42P is provided in the first attachment member 50 and the second attachment member 52. The power supply 38 is configured to be provided in the second attachment member 52. The circuitry 40 is configured to be provided in the first attachment member 50 and the second attachment member 52. The switch SW3 is attached to the second attachment member 52.

Figure 3:
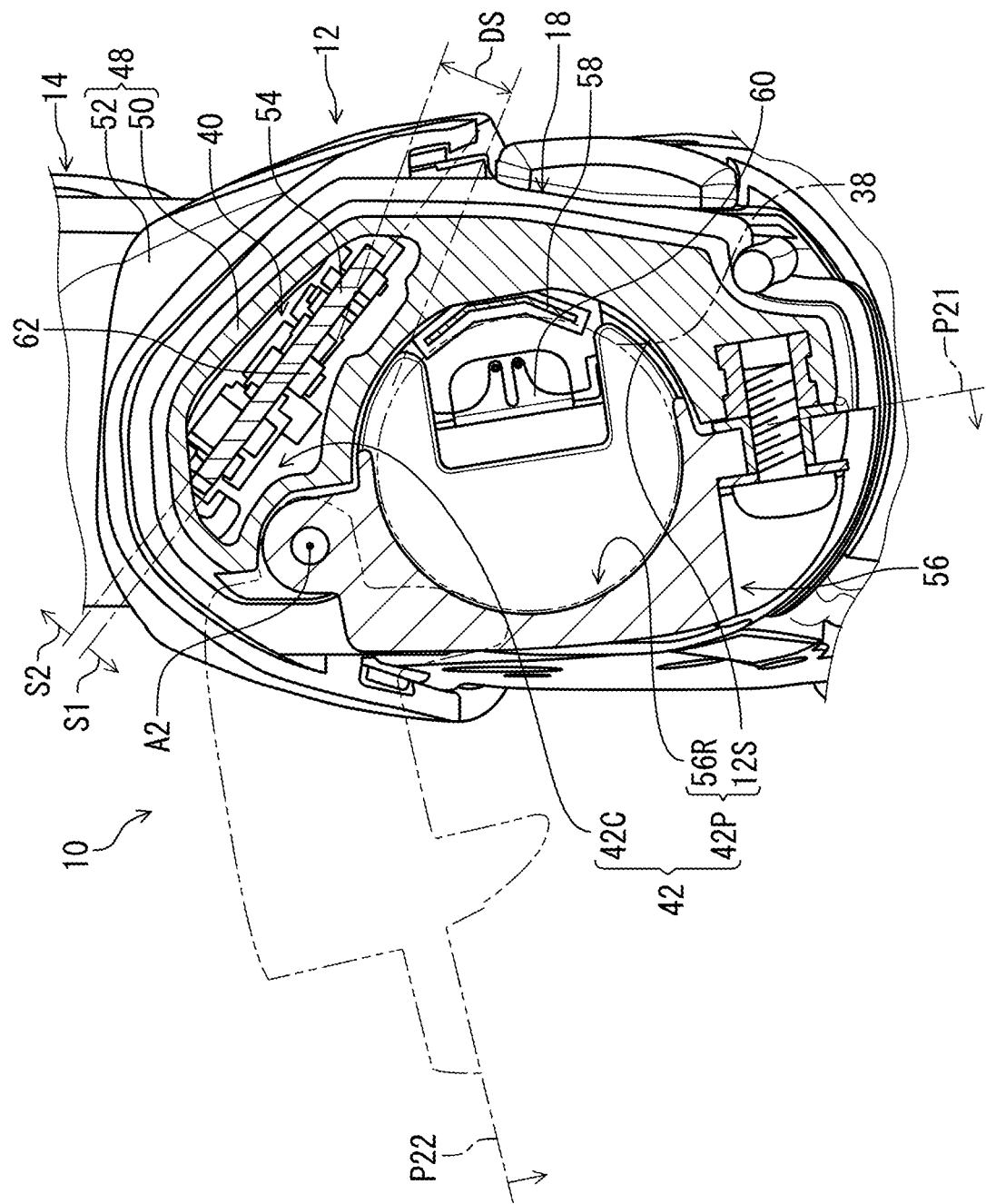
FIG. 3 is a cross-sectional view of the electric device taken along line III-III of FIG. 2.

As seen in FIG. 3, the circuitry 40 includes a circuit board 54. The circuitry 40 includes the circuit board 54, such that the circuitry 40 could be embedded, printed on, or attached to a substrate. The circuit board 54 is attached to the base member 12. The circuit board 54 is provided in the first attachment member 50 and the second attachment member 52.

The electric device 10 for the human-powered vehicle 2 comprises a power-supply holder 56 configured to accommodate the power supply 38. The power-supply holder 56 is configured to be attached to the base member 12. The power-supply holder 56 is configured to be movably coupled to the base member 12. The power-supply holder 56 is configured to be pivotally coupled to the base member 12 about a holder pivot axis A2. The power-supply holder 56 is pivotable relative to the base member 12 about the holder pivot axis A2 between an accommodation position P21 and an open position P22.

The base member 12 includes an accommodation space 12S. The power-supply holder 56 includes an accommodation recess 56R. The accommodation space 12S and the accommodation recess 56R constitute the power-supply accommodating part 42P in a state where the power-supply holder 56 is in the accommodation position P21. The accommodation recess 56R is provided outside the accommodation space 12S in a state where the power-supply holder 56 is in the open position P22.

The power supply 38 is provided in the accommodation space 12S and the accommodation recess 56R in the state where the power-supply holder 56 is in the accommodation position P21. The electric device 10 includes a positive contact 58 and a negative contact 60. The negative contact 60 is a separate member from the positive contact 58. The positive contact 58 is configured to contact a positive electrode of the power supply 38 in the state where the power supply 38 is provided in the accommodating part 42 (e.g., the power-supply accommodating part 42P). The negative contact 60 is configured to contact a negative electrode of the power supply 38 in the state where the power supply 38 is provided in the accommodating part 42 (e.g., the power-supply accommodating part 42P).

The electric device 10 for the human-powered vehicle 2 comprises a wireless antenna 62. At least one of the wireless antenna 62 and the power-supply holder 56 is provided to the second end portion 18. The wireless antenna 62 is electrically mounted on the circuit board 54. In the present embodiment, the wireless antenna 62 and the power-supply holder 56 are provided to the second end portion 18. However, at least one of the wireless antenna 62 and the power-supply holder 56 can be provided to other portions of the base member 12 such as the first end portion 16 and the grip portion.

The circuitry 40 has a first side S1 and a second side S2 provided on a reverse side of the first side S1. The wireless antenna 62 is provided to the first side S1 of the circuitry 40. The circuit board 54 has the first side S1 and the second side S2. The wireless antenna 62 is provided to the first side S1 of the circuit board 54. In the present embodiment, the wireless antenna 62 includes a pattern antenna having a wiring pattern. However, the wireless antenna 62 can be other antennas such as a chip antenna if needed and/or desired.

Figure 4:
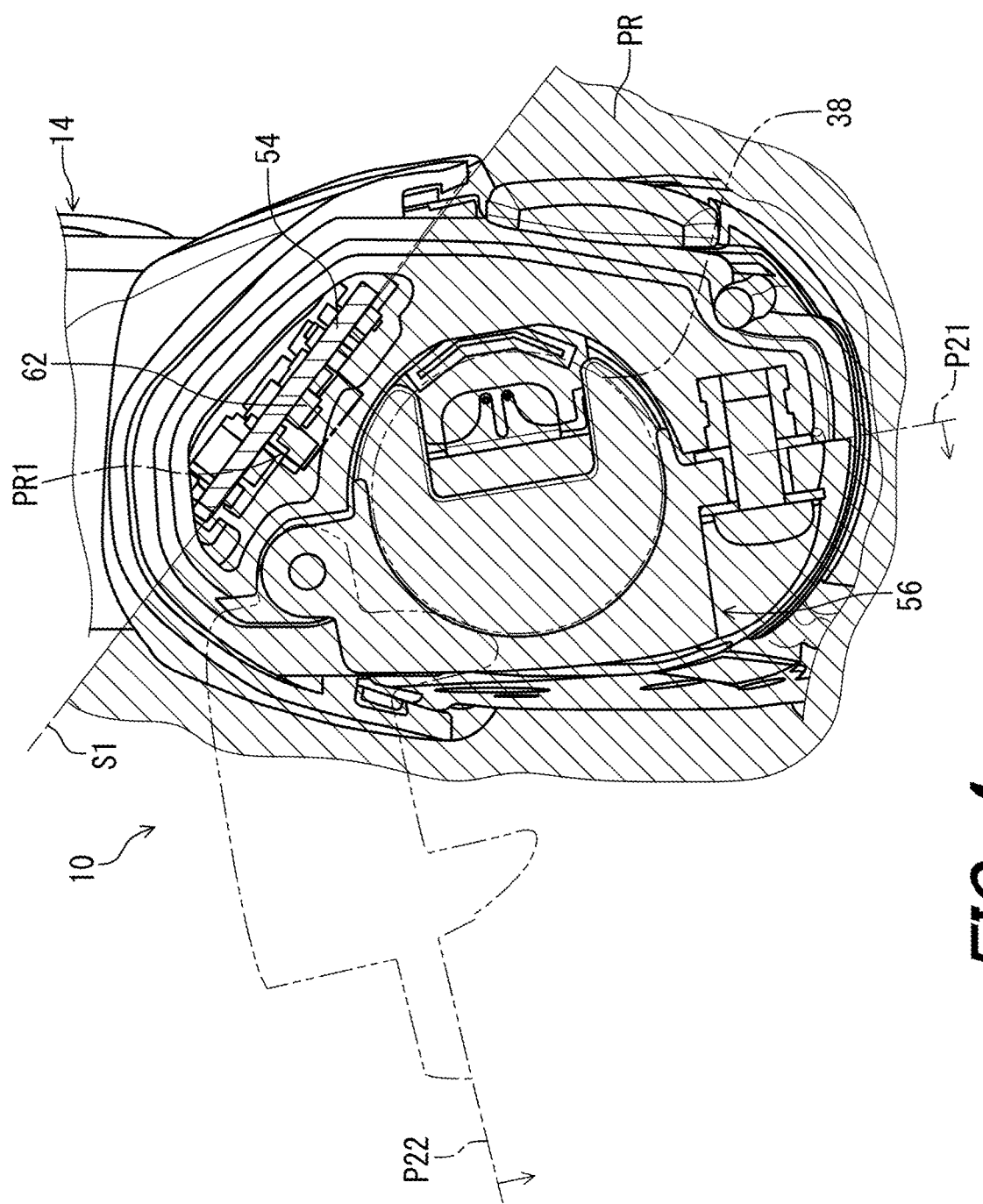
FIG. 4 is a cross-sectional view of the electric device taken along line IV-IV of FIG. 2, with a predetermined range.

As seen in FIG. 4, the power-supply holder 56 is provided to the first side S1 of the circuitry 40 in a predetermined range PR equal to or longer than 3 mm with respect to the wireless antenna 62. A chain line PR1 indicates a distance of 3 mm from the wireless antenna 62. The power-supply holder 56 is provided to the first side S1 of the circuitry 40 in the predetermined range PR equal to or longer than 3 mm with respect to the wireless antenna 62 in the state where the power-supply holder 56 is in the accommodation position P21. The power supply 38 is provided to the first side S1 of the circuitry 40 in the predetermined range PR equal to or longer than 3 mm with respect to the wireless antenna 62 in an accommodation state where the power-supply holder 56 accommodates the power supply 38. In other words, as seen in FIG. 3, a distance DS defined between the power supply 38 and the wireless antenna 62 is equal to or longer than 3 mm in the accommodation state.

Figure 5:
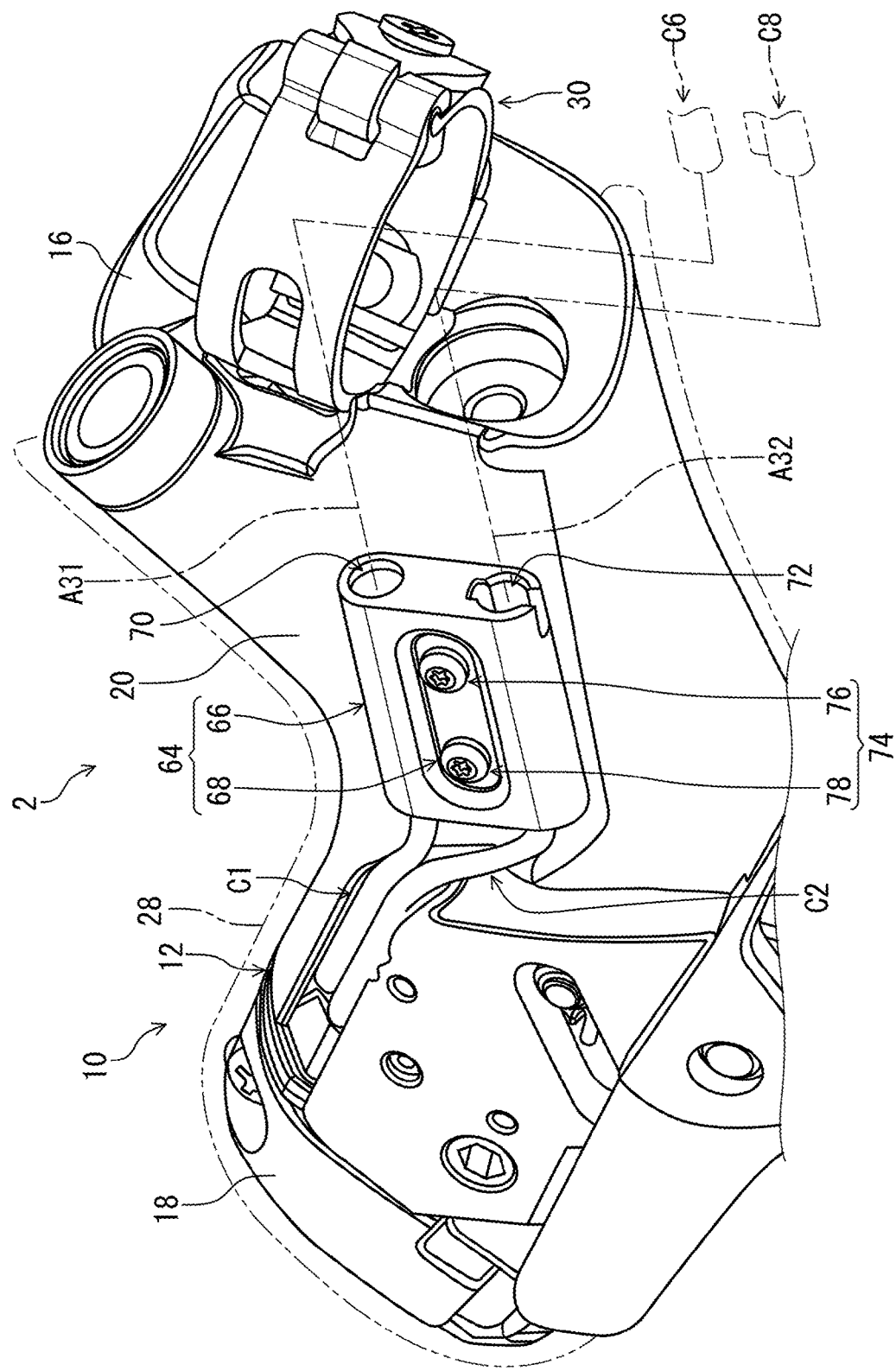
FIG. 5 is a partial perspective view of the electric device and the electric connector device illustrated in FIG. 2.

As seen in FIG. 5, the human-powered vehicle 2 comprises an electric connector device 64. The electric connector device 64 for the human-powered vehicle 2 comprises a connector base 66 and a coupling structure 68. The connector base 66 includes a first connection port 70 and a second connection port 72. The coupling structure 68 is configured to detachably attach the connector base 66 to the additional device 10 so that the connector base 66 is non-movably attached to the additional device 10. The coupling structure 68 is configured to detachably attach the connector base 66 to the additional device 10 so that the connector base 66 is non-movably attached to the base member 12 of the additional device 10. The electric connector device 64 is covered with the grip cover 28.

In the present embodiment, the connector base 66 includes the first connection port 70 and the second connection port 72. However, the connector base 66 includes can include three or more connection ports if needed and/or desired. In case where the connector base 66 includes two or more connection ports, the shapes, structures, functions and/or alignments of the connection ports can be different from each other if needed and/or desired.

The electric connector device 64 includes a first connection cable C1 and a second connection cable C2. The first connection cable C1 and the second connection cable C2 are configured to be electrically connected to the circuitry 40 (see, e.g., FIG. 3). The first connection port 70 is configured to receive an electric control cable such as a first control cable C6. The second connection port 72 is configured to receive an electric control cable such as a second control cable C8. The first connection port 70 is configured to receive the first control cable C6 to be electrically connected to the first connection cable C1. The second connection port 72 is configured to receive to be electrically connected to the second connection cable C2. The coupling structure 68 is configured to restrict the connector base 66 from moving relative to the additional device 10 so as to reduce force applied to the first connection cable C1 when the first control cable C6 is inserted into and/or removed from the first connection port 70. The coupling structure 68 is configured to restrict the connector base 66 from moving relative to the additional device 10 so as to reduce force applied to the second connection cable C2 when the second control cable C8 is inserted into and/or removed from the second connection port 72.

The coupling structure 68 includes a coupling member 74 configured to attach the connector base 66 to the additional device 10. The coupling member 74 is a separate member from the connector base 66. The coupling member 74 includes a first coupling member 76 and a second coupling member 78. The second coupling member 78 is separate from the first coupling member 76.

The first coupling member 76 is configured to detachably attach the connector base 66 to the additional device 10. The second coupling member 78 is configured to detachably attach the connector base 66 to the additional device 10. The first coupling member 76 is configured to detachably attach the connector base 66 to the additional device 10 so that the connector base 66 is non-movably attached to the base member 12 of the additional device 10. The second coupling member 78 is configured to detachably attach the connector base 66 to the additional device 10 so that the connector base 66 is non-movably attached to the base member 12 of the additional device 10.

Figure 6:
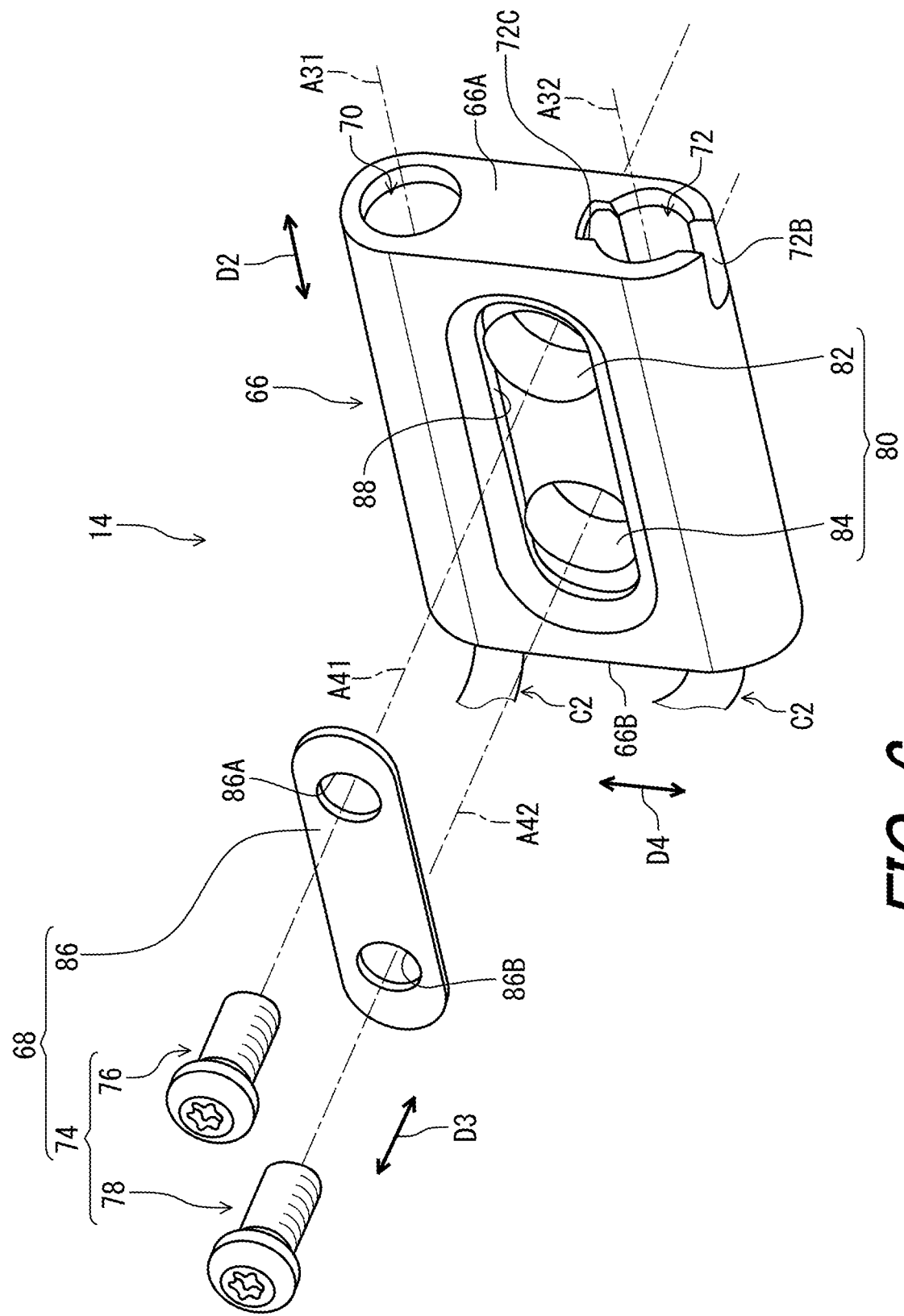
FIG. 6 is an exploded perspective view of the electric connector device illustrated in FIG. 5.

As seen in FIG. 6, the coupling structure 68 includes an opening 80 disposed on the connector base 66. The first coupling member 76 and the second coupling member 78 are configured to extend through the opening 80 in an attaching state where the coupling member 74 attaches the connector base 66 to the additional device 10. The opening 80 includes a first opening 82 and a second opening 84. The first opening 82 has a first opening axis A41 and extends along the first opening 82. The second opening 84 has a second opening axis A42 and extends along the second opening 84.

The first coupling member 76 is configured to extend through the first opening 82 in the attaching state where the coupling member 74 attaches the connector base 66 to the additional device 10 (see, e.g., FIG. 5). The second coupling member 78 is configured to extend through the second opening 84 in the attaching state where the coupling member 74 attaches the connector base 66 to the additional device 10 (see, e.g., FIG. 5). However, at least one of the first opening 82 and the second opening 84 can be omitted from the opening 80. The opening 80 can have other shapes such as an elongated shape. Namely, the opening 80 can include an elongated hole. The first coupling member 76 and the second coupling member 78 can be arranged to extend through the elongated hole.

The coupling structure 68 includes an intermediate plate 86 configured to be provided between the connector base 66 and the coupling member 74. The connector base 66 includes a recess 88. The intermediate plate 86 is configured to be provided in the recess 88. The opening 80 is provided in the recess 88. The first opening 82 and the second opening 84 are provided in the recess 88.

The intermediate plate 86 includes a first hole 86A and a second hole 86B. The first coupling member 76 is configured to extend through the first hole 86A in the attaching state where the coupling member 74 attaches the connector base 66 to the additional device 10 (see, e.g., FIG. 5). The second coupling member 78 is configured to extend through the second hole 86B in the attaching state where the coupling member 74 attaches the connector base 66 to the additional device 10 (see, e.g., FIG. 5).

Figure 7:
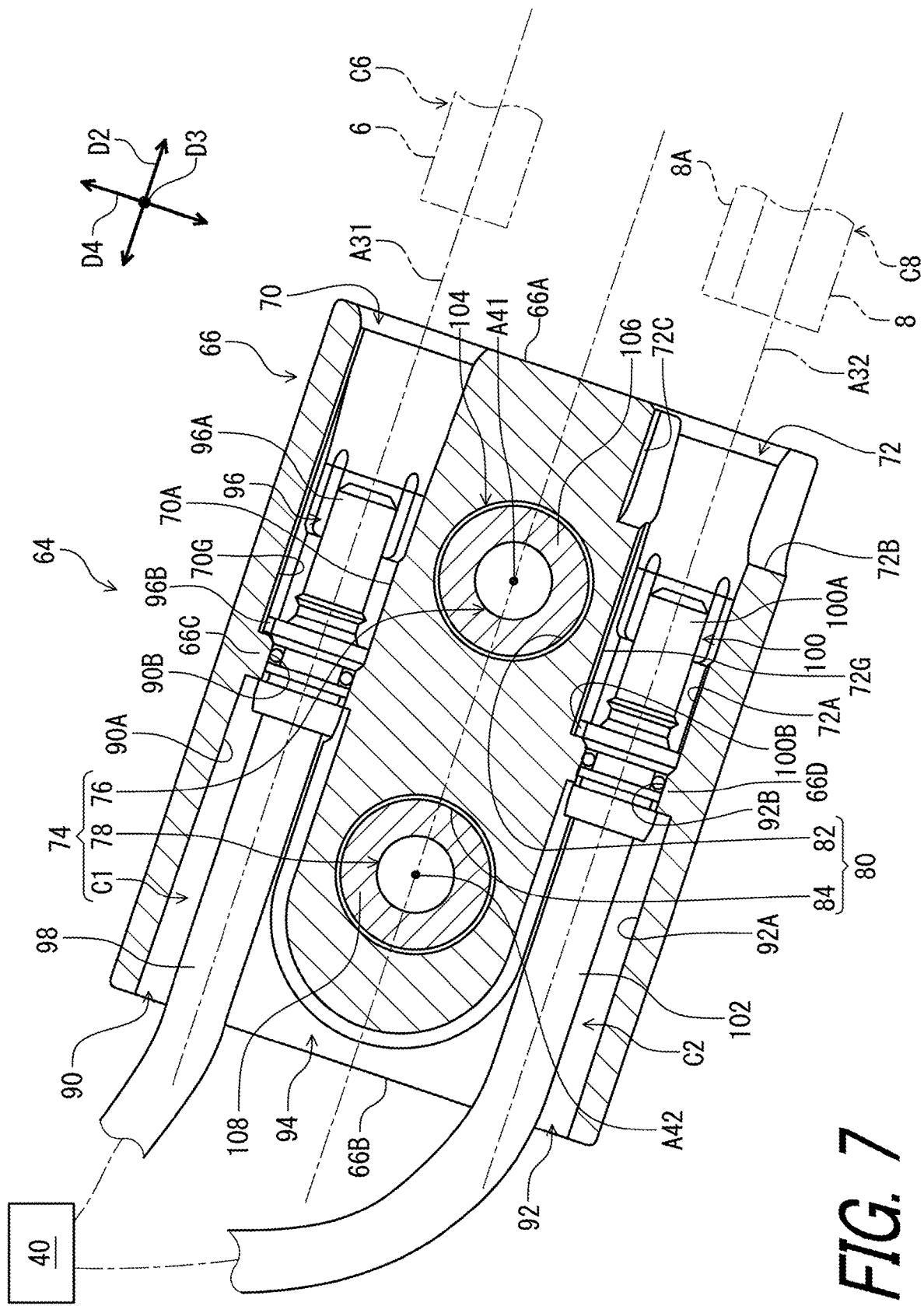
FIG. 7 is a cross-sectional view of the electric connector device taken along line IIV-IIV of FIG. 10.

As seen in FIG. 7, the first connection port 70 defines a first center axis A31. The second connection port 72 defines a second center axis A32. The first connection port 70 includes a first connection hole 70A. The first connection hole 70A has the first center axis A31. The second connection port 72 includes a second connection hole 72A. The second connection hole 72A has the second center axis A32. The first center axis A31 and the second center axis A32 extend along an axial direction D2.

The second center axis A32 is spaced apart from the first center axis A31 as viewed in a predetermined direction D3. The predetermined direction D3 is perpendicular to the sheet of FIG. 7. The predetermined direction D3 is perpendicular to the axial direction D2. The second center axis A32 is spaced apart from the first center axis A31 in an arrangement direction D4 as viewed in the predetermined direction D3. The arrangement direction D4 is perpendicular to the axial direction D2 and the predetermined direction D3. In the present embodiment, the first center axis A31 is parallel to the second center axis A32 as viewed in the predetermined direction D3. However, the first center axis A31 can be inclined relative to the second center axis A32 as viewed in the predetermined direction D3.

The connector base 66 includes a first end 66A and a second end 66B. The second end 66B is provided on a reverse side of the first end 66A in the axial direction D2. The first connection port 70 and the second connection port 72 extend from the first end 66A toward the second end 66B in the axial direction D2.

The connector base 66 includes a first cable opening 90 and a second cable opening 92. The first cable opening 90 and the second cable opening 92 extend from the second end 66B toward the first end 66A in the axial direction D2. The first cable opening 90 is connected to the first connection port 70. The second cable opening 92 is connected to the second connection port 72.

The first cable opening 90 includes a first cable hole 90A and a first attachment hole 90B. The first attachment hole 90B is provided between the first cable hole 90A and the first connection port 70. The first attachment hole 90B is connected to the first connection hole 70A of the first connection port 70. The first attachment hole 90B has an inner diameter smaller than inner dimeters of the first connection hole 70A and the first cable hole 90A.

The second cable opening 92 includes a second cable hole 92A and a second attachment hole 92B. The second attachment hole 92B is provided between the second cable hole 92A and the second connection port 72. The second attachment hole 92B is connected to the second connection hole 72A of the second connection port 72. The second attachment hole 92B has an inner diameter smaller than inner dimeters of the second connection hole 72A and the second cable hole 92A.

The connector base 66 includes an intermediate opening 94 provided between the first cable opening 90 and the second cable opening 92. The intermediate opening 94 connects the first cable opening 90 to the second cable opening 92. However, the intermediate opening 94 can be omitted from the connector base 66.

The first connection cable C1 includes a first receiving connector 96 and a first electric cable 98. The first receiving connector 96 is provided in the first connection port 70 and the first cable opening 90. The first receiving connector 96 is attached to the connector base 66 and is provided in the first attachment hole 90B. The connector base 66 includes a first attachment part 66C. The first attachment part 66C protrudes radially inwardly and includes the first attachment hole 90B. The first attachment part 66C restricts the first receiving connector 96 from moving relative to the connector base 66 in the axial direction D2. The first receiving connector 96 includes a first connector body 96A and a plurality of first electric terminals provided to the first connector body 96A.

The first electric cable 98 is electrically connected to the first receiving connector 96. The first electric cable 98 includes a plurality of wires connected to the plurality of first electric terminals. The first electric cable 98 is configured to electrically connect the first receiving connector 96 to the circuitry 40. The first connection port 70 is configured to receive a first connector 6 of the first control cable C6. The first receiving connector 96 is configured to be electrically connected to the first connector 6 in a state where the first connector 6 is inserted in the first connection port 70. The first connection port 70 is configured to receive the first control cable C6 configured to supply electricity to the electric device 10 and to transmit signals between the electric device 10 and other devices such as the electric components BC2 and BC3. However, the first connection port 70 can be configured to receive electric control cables other than the first control cable C6.

The second connection cable C2 includes a second receiving connector 100 and a second electric cable 102. The second receiving connector 100 is provided in the second connection port 72 and the second cable opening 92. The second receiving connector 100 is attached to the connector base 66 and is provided in the second attachment hole 92B to be attached to the connector base 66. The connector base 66 includes a second attachment part 66D. The second attachment part 66D protrudes radially inwardly and includes the second attachment hole 92B. The second attachment part 66D restricts the second receiving connector 100 from moving relative to the connector base 66 in the axial direction D2. The second receiving connector 100 includes a second connector body 100A and a plurality of second electric terminals provided to the second connector body 100A.

The second electric cable 102 is electrically connected to the second receiving connector 100. The second electric cable 102 includes a plurality of wires connected to the plurality of second electric terminals. The second electric cable 102 is configured to electrically connect the second receiving connector 100 to the circuitry 40. The second connection port 72 is configured to receive a second connector 8 of the second control cable C8. The second receiving connector 100 is configured to be electrically connected to the second connector 8 in a state where the second connector 8 is inserted in the second connection port 72. The second connection port 72 is configured to receive the second control cable C8 configured to transmit signals between the electric device 10 and other devices. However, the second connection port 72 can be configured to receive electric control cables other than the second control cable C8.

As seen in FIGS. 6 and 7, the second connection port 72 includes a first groove 72B and a second groove 72C. The first groove 72B and the second groove 72C extend along the second center axis A32. The second center axis A32 is provided between the first groove 72B and the second groove 72C.

As seen in FIG. 7, the second connector 8 has a shape different from a shape of the first connector 6. The second connector 8 includes a protrusion 8A. The protrusion 104 8A is provided in one of the first groove 72B and the second groove 72C in a state where the second connector 8 is provided in the second connection port 72. The first connection port 70 does not include a groove such as the first groove 72B and the second groove 72C. Thus, the first connection port 70 is configured not to receive the second connector 8. At least one of the first groove 72B and the second groove 72C can be omitted from the second connection port 72. The first connection port 70 can include a groove such as the first groove 72B and the second groove 72C.

Figure 8:
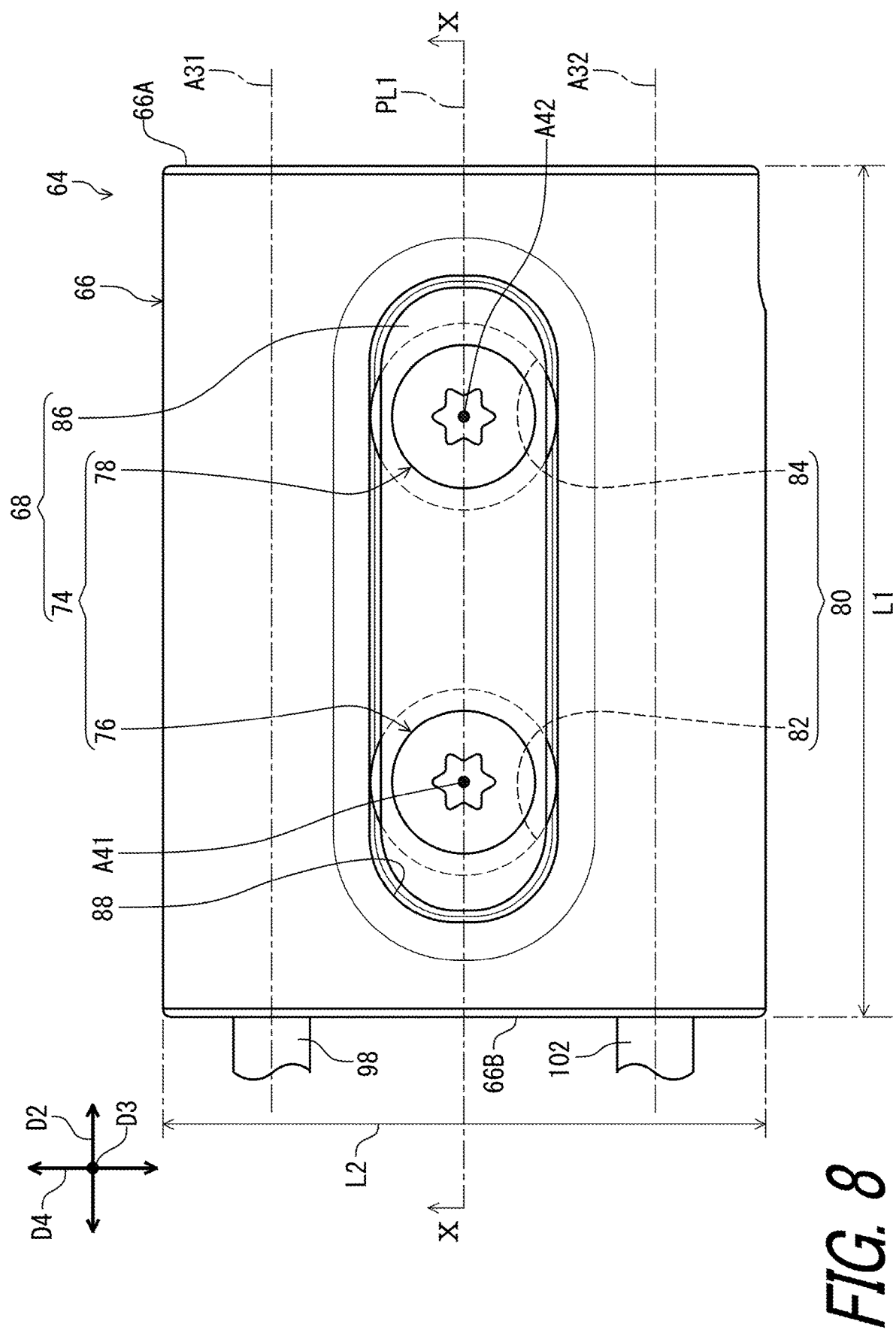
FIG. 8 is a side elevational view of the electric connector device illustrated in FIG. 5.

As seen in FIG. 8, the coupling structure 68 is provided between the first center axis A31 and the second center axis A32 as viewed in the predetermined direction D3. The coupling member 74 is provided between the first center axis A31 and the second center axis A32 as viewed in the predetermined direction D3. The intermediate plate 86 is provided between the first center axis A31 and the second center axis A32 as viewed in the predetermined direction D3. At least one of the first coupling member 76 and the second coupling member 78 is provided between the first center axis A31 and the second center axis A32 as viewed in the predetermined direction D3. In the present embodiment, both of the first coupling member 76 and the second coupling member 78 are provided between the first center axis A31 and the second center axis A32 as viewed in the predetermined direction D3. However, at least one of the first coupling member 76 and the second coupling member 78 can be provided outside an area defined between the first center axis A31 and the second center axis A32 as viewed in the predetermined direction D3.

The opening 80 is provided between the first center axis A31 and the second center axis A32 as viewed in the predetermined direction D3. The first opening 82 is provided between the first center axis A31 and the second center axis A32 as viewed in the predetermined direction D3. The second opening 84 is provided between the first center axis A31 and the second center axis A32 as viewed in the predetermined direction D3.

The recess 88 extends along at least one of the first center axis A31 and the second center axis A32 as viewed in the predetermined direction D3. The recess 88 extends along the first center axis A31 and the second center axis A32 as viewed in the predetermined direction D3. The coupling structure 68 is provided in the recess 88 as viewed in the predetermined direction D3. The first coupling member 76 and the second coupling member 78 are provided in the recess 88 as viewed in the predetermined direction D3. The opening 80 is provided in the recess 88 as viewed in the predetermined direction D3. The first opening 82 and the second opening 84 are provided in the recess 88 as viewed in the predetermined direction D3. The intermediate plate 86 is provided in the recess 88 as viewed in the predetermined direction D3. However, the recess 88 can be omitted from the connector base 66.

The connector base 66 has a first length L1 defined in the axial direction D2. The connector base 66 has a second length L2 defined in the arrangement direction D4. The first length L1 is longer than the second length L2. However, the dimensional relationship between the first length L1 and the second length L2 is not limited to the present embodiment.

A first reference plane PL1 is defined to bisect the second length L2 of the connector base 66. The first reference plane PL1 is parallel to the axial direction D2 and the predetermined direction D3 and is perpendicular to the arrangement direction D4. The first reference plane PL1 is provided on the first opening axis A41 and the second opening axis A42 as viewed in the predetermined direction D3.

Figure 9:
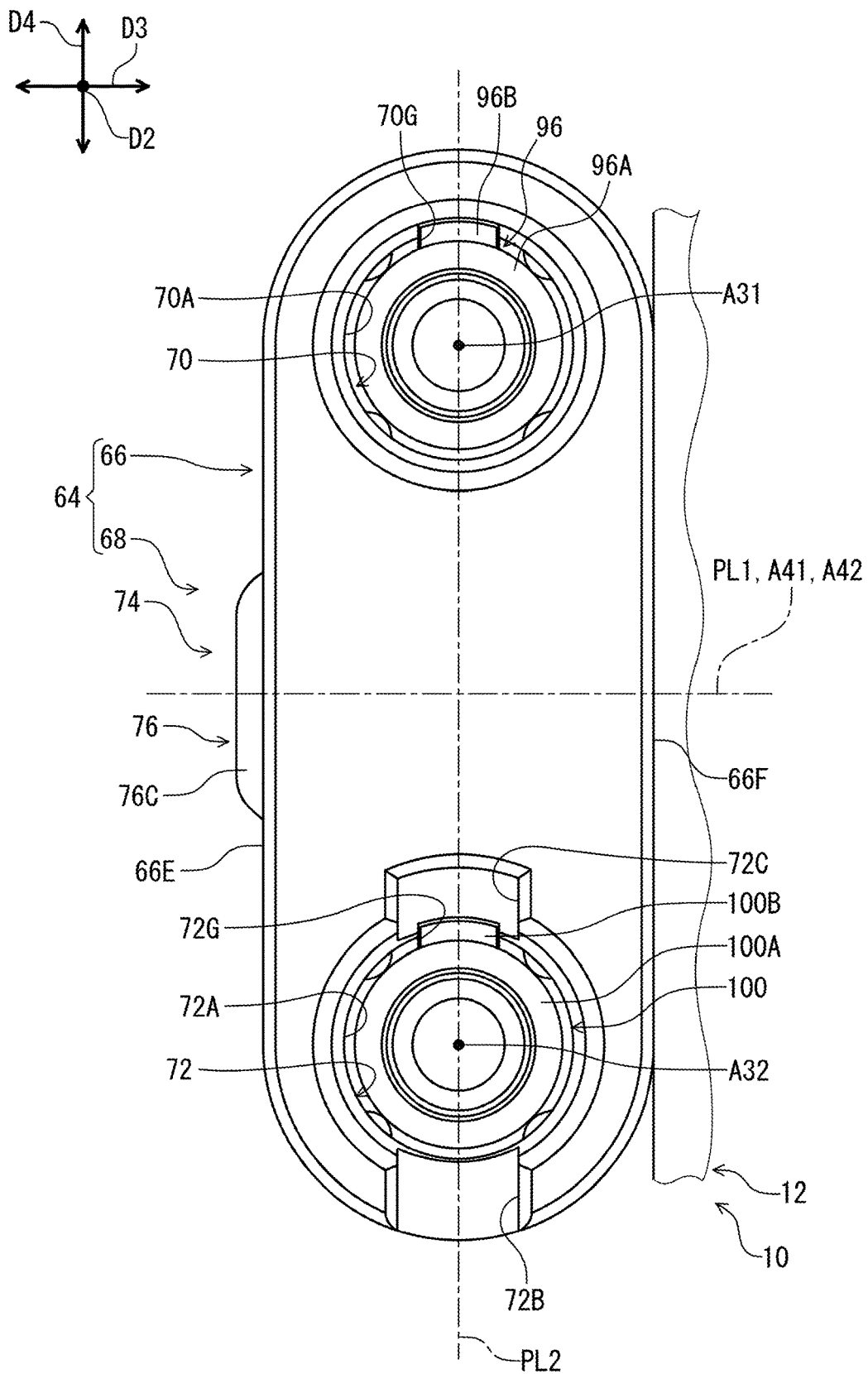
FIG. 9 is a cross-sectional view of the electric connector device taken along line X-X of FIG. 8.

As seen in FIGS. 7 and 9, the connector base 66 has an asymmetrical shape with respect to the first reference plane PL1 as viewed in the predetermined direction D3. However, the connector base 66 can have a symmetrical shape with respect to the first reference plane PL1.

The first receiving connector 96 includes a first projection 96B. The first projection 96B protrudes radially outwardly from the first connector body 96A. The first connection port 70 includes a first attachment groove 70G. The first projection 96B is provided in the first attachment groove 70G in a state where the first receiving connector 96 is attached to the connector base 66.

The second receiving connector 100 includes a second projection 100B. The second projection 100B protrudes radially outwardly from the second connector body 100A. The second connection port 72 includes a second attachment groove 72G. The second projection 100B is provided in the second attachment groove 72G in a state where the second receiving connector 100 is attached to the connector base 66.

Figure 10:
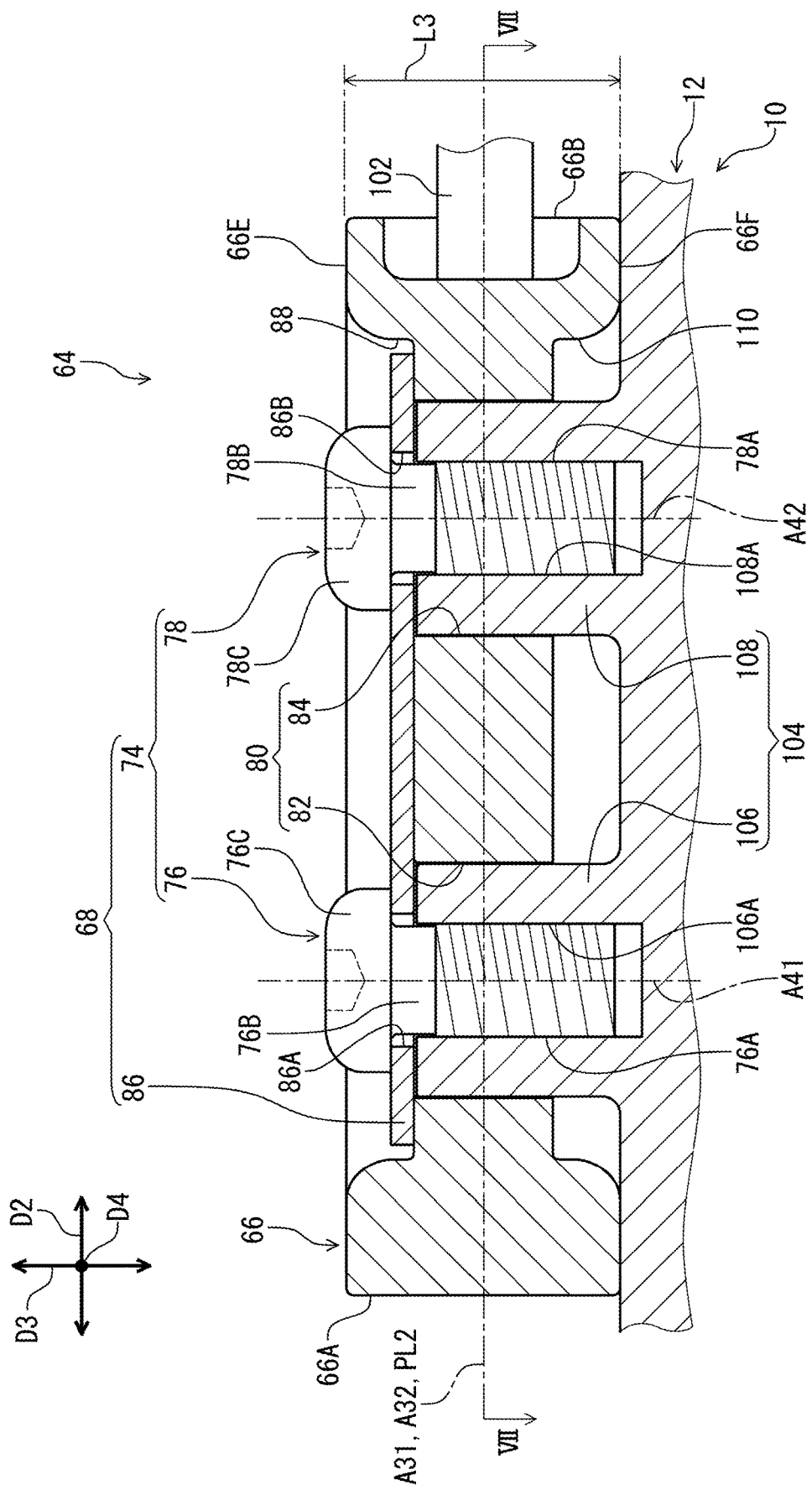
FIG. 10 is another side elevational view of the electric connector device illustrated in FIG. 5.

As seen in FIG. 10, at least one of the first coupling member 76 and the second coupling member 78 extends in the predetermined direction D3. At least one of the first coupling member 76 and the second coupling member 78 includes an external thread configured to be threadedly engaged with the additional device 10. In the present embodiment, the first coupling member 76 and the second coupling member 78 extend in the predetermined direction D3. The first coupling member 76 includes an external thread 76A configured to be threadedly engaged with the base member 12 of the additional device 10. The second coupling member 78 includes an external thread 78A configured to be threadedly engaged with the base member 12 of the additional device 10. However, the structures of the first coupling member 76 and the second coupling member 78 are not limited to the present embodiment. The external thread 76A can be omitted from the first coupling member 76 if needed and/or desired. The external thread 78A can be omitted from the second coupling member 78 if needed and/or desired.

At least one of the first center axis A31 and the second center axis A32 is perpendicular to the predetermined direction D3. In the present embodiment, the first center axis A31 and the second center axis A32 are perpendicular to the predetermined direction D3. However, at least one of the first center axis A31 and the second center axis A32 can be non-perpendicular to the predetermined direction D3.

The additional device 10 includes a protrusion 104 to which the first coupling member 76 and the second coupling member 78 are coupled. The protrusion 104 is configured to extend through the opening 80 in the attaching state. In the present embodiment, the protrusion 104 includes a first protrusion 106 and a second protrusion 108. The first protrusion 106 is configured to extend through the first opening 82 in the attaching state. The second protrusion 108 is configured to extend through the second opening 84 in the attaching state. The first coupling member 76 and the second coupling member 78 are coupled to the first protrusion 106 and the second protrusion 108 respectively in the attaching state.

The first protrusion 106 includes a first threaded hole 106A. The second protrusion 108 includes a second threaded hole 108A. The external thread 76A of the first coupling member 76 is threadedly engaged with the first threaded hole 106A. The external thread 78A of the second coupling member 78 is threadedly engaged with the second threaded hole 108A.

The first coupling member 76 includes a first rod 76B and a first head 76C. The external thread 76A is provided on an outer periphery of the first rod 76B. The first head 76C is provided at one end of the first rod 76B. The intermediate plate 86 is held between the first head 76C and the connector base 66 in the attaching state.

The second coupling member 78 includes a second rod 78B and a second head 78C. The external thread 78A is provided on an outer periphery of the second rod 78B. The second head 78C is provided at one end of the second rod 78B. The intermediate plate 86 is held between the second head 78C and the connector base 66 in the attaching state.

The first head 76C of the first coupling member 76 is provided in the recess 88 in the attaching state. The second head 78C of the second coupling member 78 is provided in the recess 88 in the attaching state.

The connector base 66 includes a first surface 66E and a second surface 66F. The second surface 66F is provided on a reverse side of the first surface 66E in the predetermined direction D3. The recess 88 is provided on the first surface 66E. The connector base 66 includes an additional recess 110. The additional recess 110 is provided on the second surface 66F. The second surface 66F of the connector base 66 is provided between the first surface 66E and the base member 12 of the additional device 10 in the attaching state. The second surface 66F of the connector base 66 contacts the base member 12 of the additional device 10 in the attaching state.

The connector base 66 has a thickness L3 defined between the first surface 66E and the second surface 66F in the predetermined direction D3. The thickness L3 is shorter than the first length L1 and the second length L2 (see, e.g., FIG. 8). A second reference plane PL2 is defined to bisect the thickness L3. The second reference plane PL2 is parallel to the axial direction D2 and is perpendicular to the predetermined direction D3. The connector base 66 has a symmetrical shape with respect to the second reference plane PL2. However, the connector base 66 can have an asymmetrical shape with respect to the second reference plane PL2.

Figure 11:
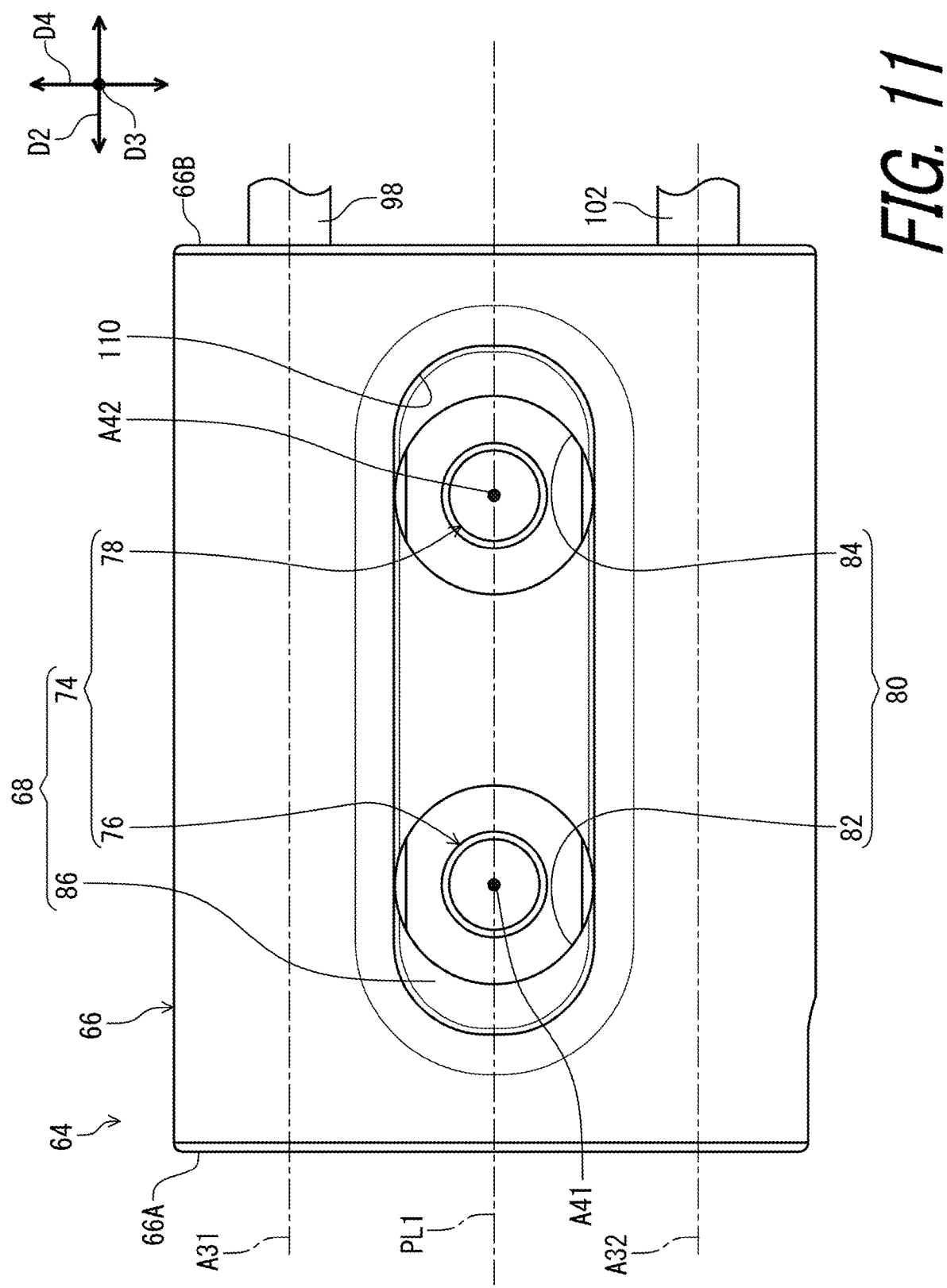
FIG. 11 is another side elevational view of the electric connector device illustrated in FIG. 5.

As seen in FIG. 11, the additional recess 110 extends along at least one of the first center axis A31 and the second center axis A32 as viewed in the predetermined direction D3. The coupling structure 68 is provided in the additional recess 110 as viewed in the predetermined direction D3. The first coupling member 76 and the second coupling member 78 are provided in the additional recess 110 as viewed in the predetermined direction D3. The opening 80 is provided in the additional recess 110 as viewed in the predetermined direction D3. The first opening 82 and the second opening 84 are provided in the additional recess 110 as viewed in the predetermined direction D3. However, the additional recess 110 can be omitted from the connector base 66.

Figure 12:
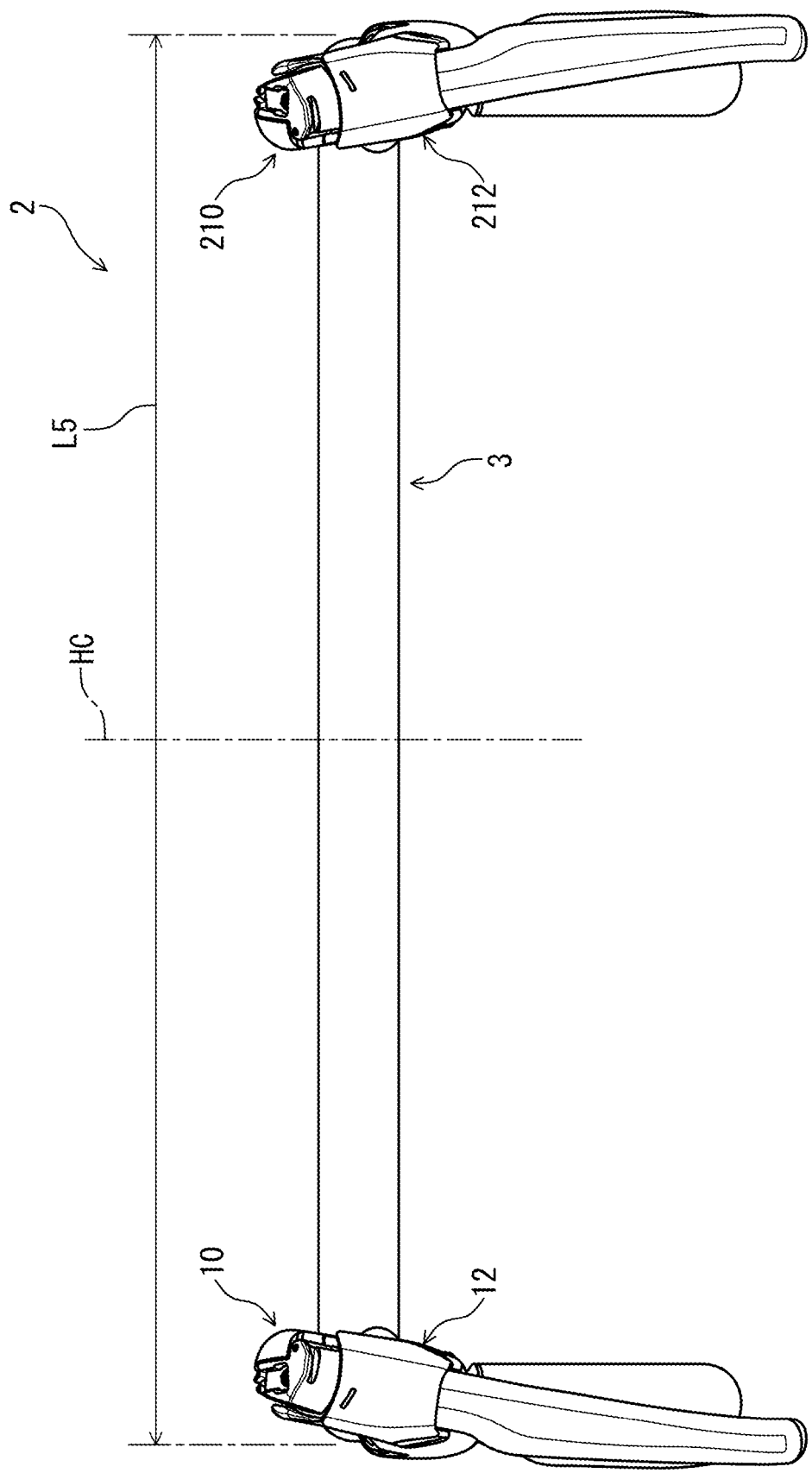
FIG. 12 is a front view of the electric device illustrated in FIG. 1, with a handlebar and another electric device.

As seen in FIG. 12, the human-powered vehicle 2 includes an additional device 210. The electric connector device 64 is configured to be attached to the additional device 210. The additional device 210 has a symmetrical shape with the additional device 10 with respect to a handlebar center plane HC. The handlebar center plane HC bisects a lateral length L5 of the handlebar 3. The additional device 210 includes a base member 212. The base member 212 has a symmetrical shape with the base member 12 of the additional device 210 with respect to the handlebar center plane HC.

Figure 13:
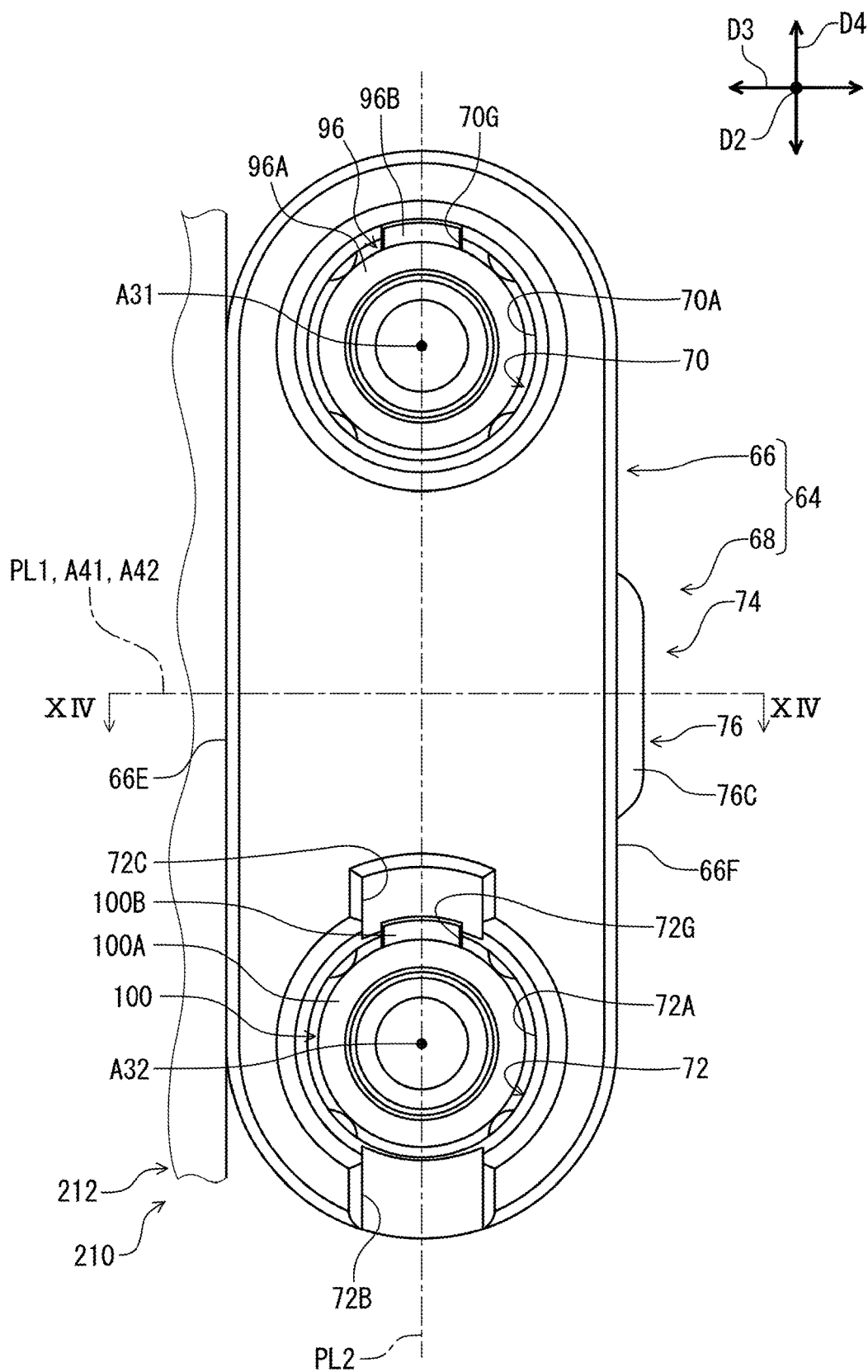
FIG. 13 is a side elevational view of the electric connector device illustrated in FIG. 5, with the other electric device.
Figure 14:
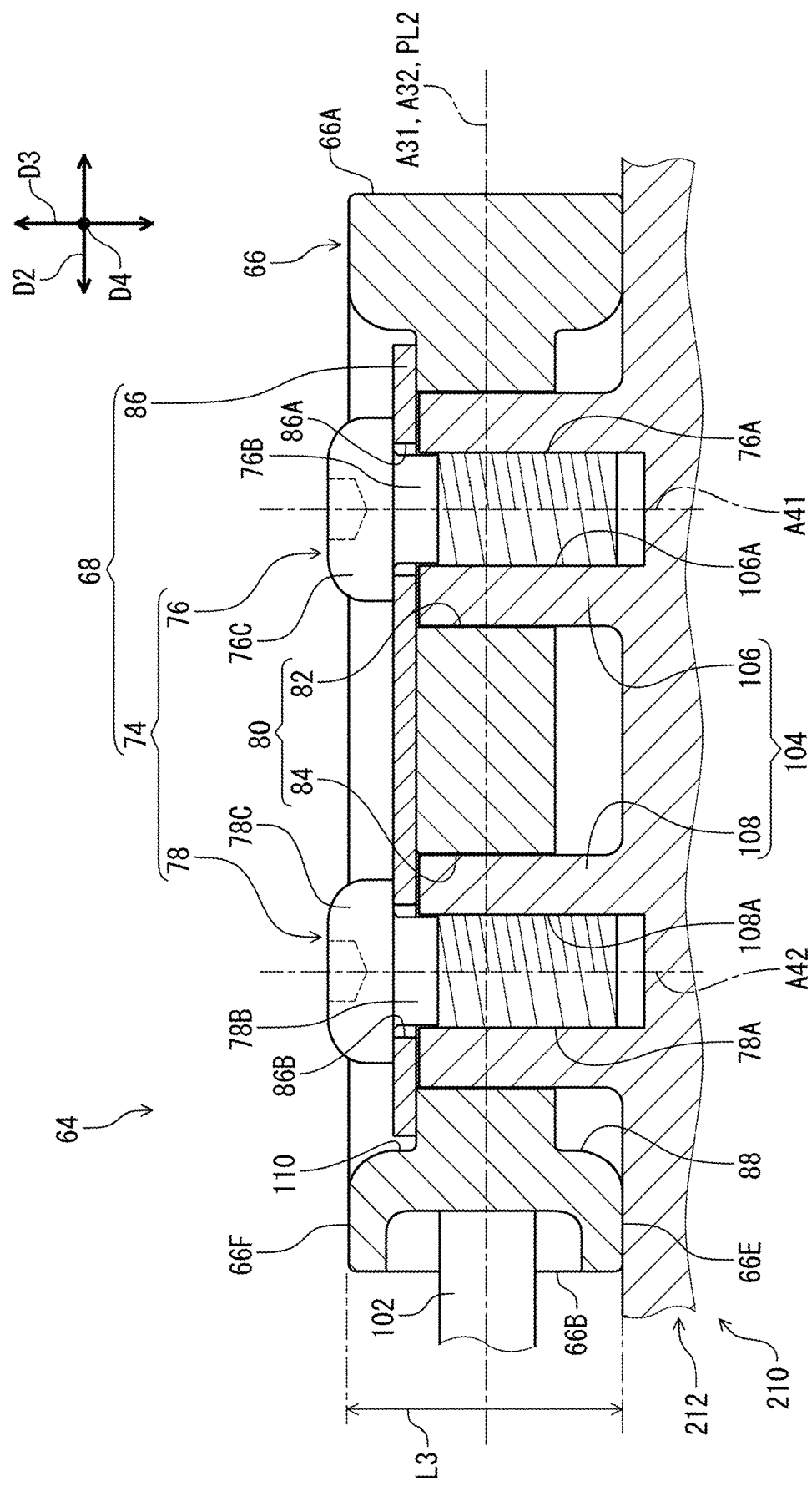
FIG. 14 is a cross-sectional view of the electric connector device taken along line XIV-XIV of FIG. 13.

As seen in FIGS. 13 and 14, the electric connector device 64 is configured to be attached to the base member 212 of the additional device 210. The first surface 66E of the connector base 66 is provided between the second surface 66F and the base member 212 of the additional device 210 in an attaching state where the coupling member 74 attaches the connector base 66 to the additional device 210. The first surface 66E of the connector base 66 contacts the base member 212 of the additional device 210 in the attaching state. The intermediate plate 86 is provided in the additional recess 110. Thus, it is possible to use the electric connector device 64 for each of the right-hand operating device and the left-hand operating device.

Figure 15:
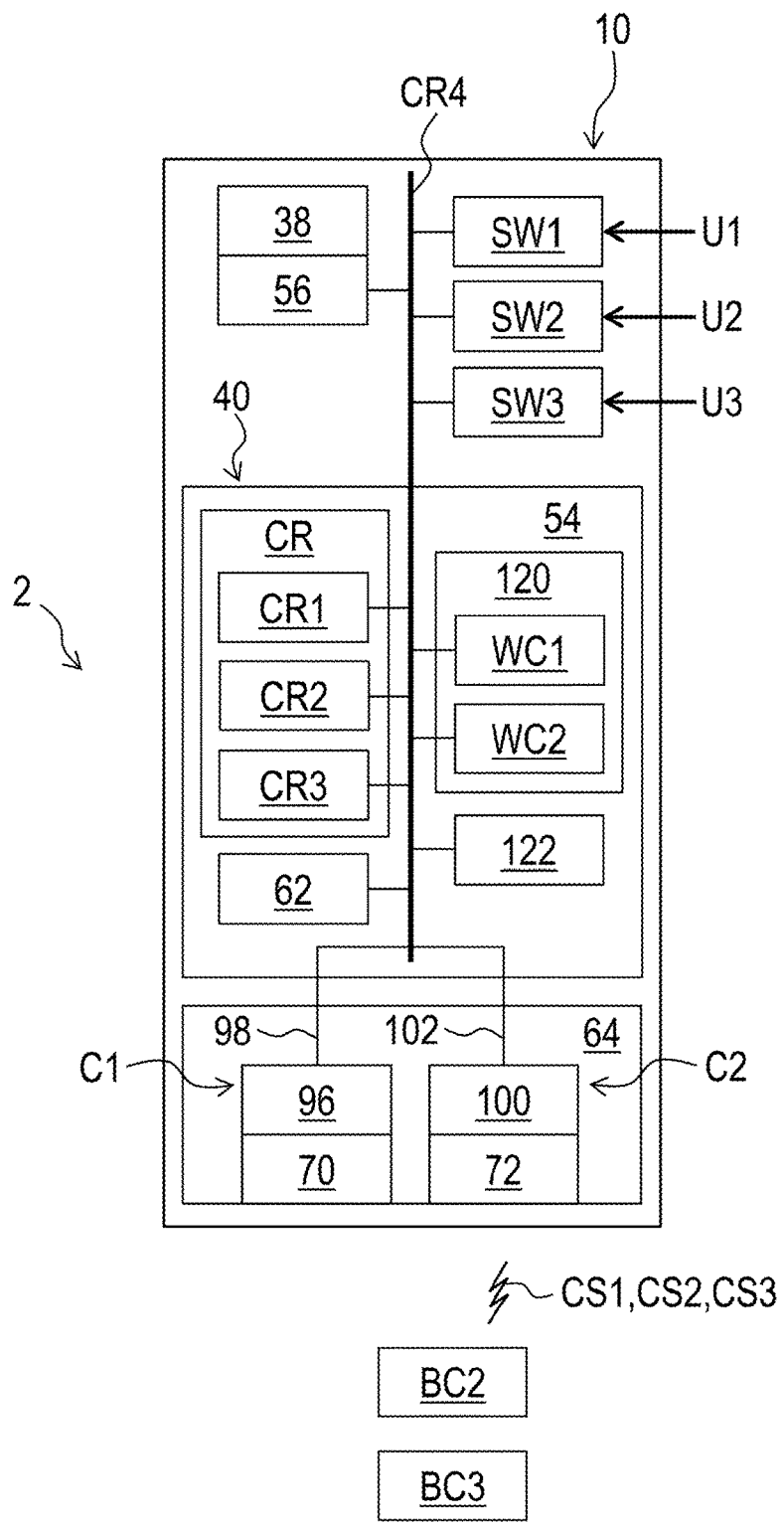
FIG. 15 is a block diagram of a human-powered vehicle including the electric device and the electric connector device illustrated in FIG. 2 (wireless communication).
Figure 16:
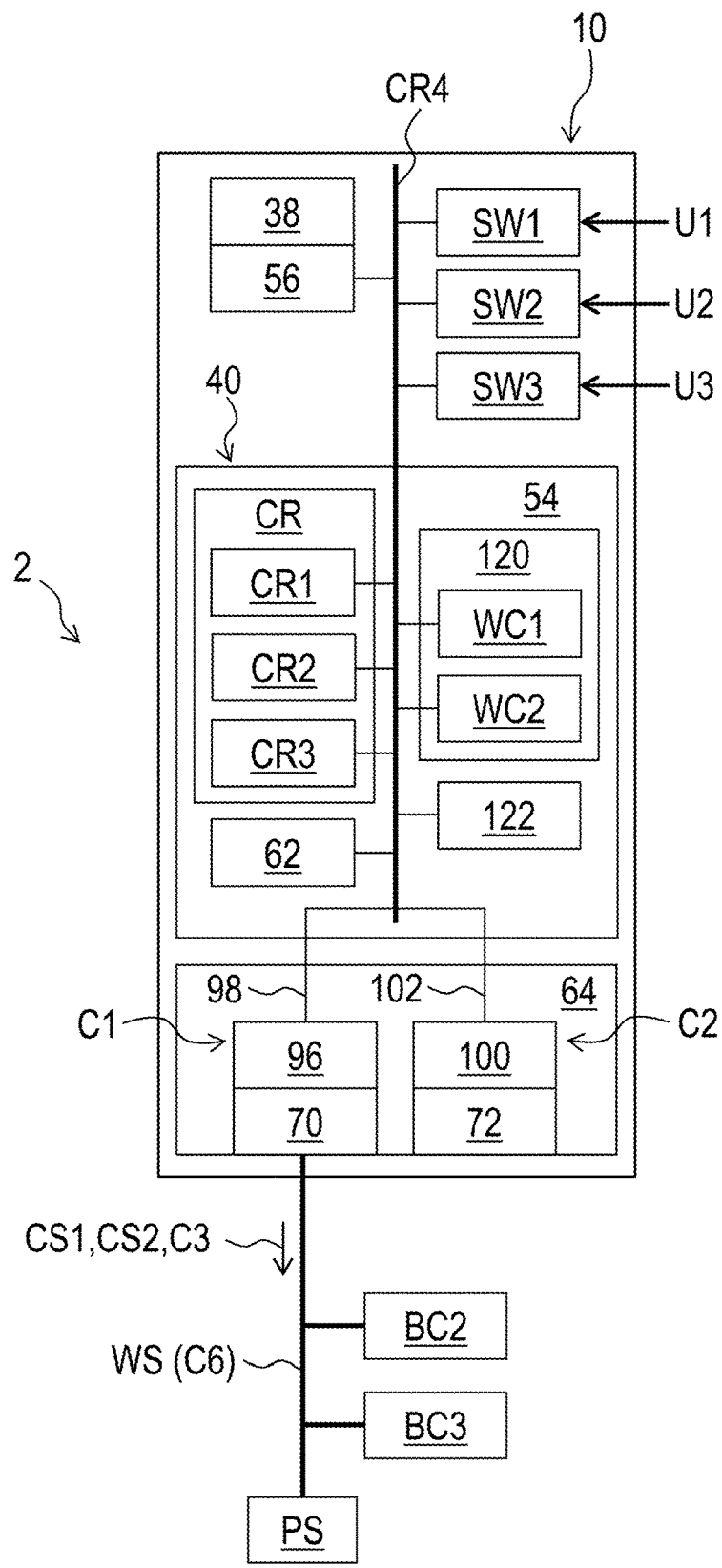
FIG. 16 is a block diagram of a human-powered vehicle including the electric device and the electric connector device illustrated in FIG. 2 (wired communication).

As seen in FIGS. 15 and 16, the circuitry 40 includes a communicator 120, an informing unit 122, and a controller CR. The wireless antenna 62, the communicator 120, the informing unit 122, and the controller CR are electrically mounted on the circuit board 54. The wireless antenna 62, the communicator 120, the informing unit 122, and the controller CR are electrically connected with each other via the circuit board 54.

The communicator 120 is configured to communicate with another device via at least one of a wired communication channel and a wireless communication channel. In the present embodiment, the communicator 120 includes a wired communicator WC1 and a wireless communicator WC2. The wired communicator WC1 is configured to communicate with a wired communicator of the electric component BC2 via a wired communication channel. The wireless communicator WC2 is configured to communicate with a wireless communicator of the electric component BC2 using the wireless antenna 62 via a wireless communication channel. The wireless communicator WC2 is configured to communicate with a wireless communicator of the additional electric component BC3 using the wireless antenna 62 via a wireless communication channel.

The controller CR is configured to control another device in response to the user inputs U1 to U3 and/or other information. In the present embodiment, the controller CR is configured to control the wired communicator WC1 and the wireless communicator WC2 to transmit a control signal CS1 and/or CS2 to the electric component BC2. The controller CR is configured to control the wired communicator WC1 and the wireless communicator WC2 to transmit a control signal CS3 to the additional electric component BC3.

In the present embodiment, the control signal CS1 indicates upshifting of the electric component BC2. The control signal CS2 indicates downshifting of the electric component BC2. The control signal CS3 indicates that the state of the additional electric component BC3 is changed between the lock state and the adjustable state.

The controller CR is configured to select one of the wired communicator WC1 and the wireless communicator WC2. In the present embodiment, the controller CR is configured to select the wireless communicator WC2 as a default communicator. The controller CR is configured to detect connection between the electric connector device 64 and an electric control cable such as the first control cable C6 and the second control cable C8.

The first receiving connector 96 is electrically connected to the controller CR through the first electric cable 98, the system bus CR4, and the circuit board 54. The second receiving connector 100 is electrically connected to the controller CR through the second electric cable 102, the system bus CR4, and the circuit board 54. The controller CR is configured to detect electricity supplied from an electric power source to the electric connector device 64. The controller CR is configured to select the wireless communicator WC2 if the electric control cable (e.g., the first control cable C6) is not connected to the electric connector device 64 (specifically, the first receiving connector 96 of the first connection cable C1). The controller CR is configured to select the wired communicator WC1 if the electric control cable (e.g., the first control cable C6) is connected to the electric connector device 64. However, the controller CR can be configured to select the wired communicator WC1 as a default communicator.

The controller CR includes a processor CR1, a memory CR2, and a system bus CR4. The processor CR1 and the memory CR2 are electrically mounted on the circuitry 40. The processor CR1 includes a central processing unit (CPU) and a memory controller. The processor CR1 is electrically connected to the memory CR2 with the circuitry 40 and the system bus CR4. The wired communicator WC1 and the wireless communicator WC2 are configured to be electrically mounted on the circuitry 40. Each of the wired communicator WC1 and the wireless communicator WC2 is electrically connected to the processor CR1 and the memory CR2 with the circuitry 40 and the system bus CR4.

The memory CR2 includes a read only memory (ROM) and a random-access memory (RAM). The memory CR2 includes storage areas each having an address in the ROM and the RAM. The processor CR1 is configured to control the memory CR2 to store data in the storage areas of the memory CR2 and reads data from the storage areas of the memory CR2. The memory CR2 (e.g., the ROM) stores a program. The program is read into the processor CR1, and thereby the configuration and/or algorithm of the communicator 120 is performed.

In the present embodiment, the wired communication channel is established using power line communication (PLC) technology. More specifically, the electric control cable (e.g., the first control cable C6 and the second control cable C8) includes a ground line and a voltage line. The PLC technology is used for communicating between electric components. The PLC carries data on a conductor that is also used simultaneously for electric power transmission or electric power distribution to the electric components.

As seen in FIG. 16, in the present embodiment, the human-powered vehicle 2 can include an electric power source PS provided separately from the power supply 38. The electric power source PS is a separate power source from the power supply 38. The electric power source PS is configured to be mounted to a vehicle frame. For example, the electric power source PS has a capacity greater than a capacity of the power supply 38. The electric power source PS is configured to be electrically connected to the electric connector device 64 via the electric control cable (e.g., the first control cable C6). Electricity is supplied from the electric power source PS through the electric wiring structure WS connected to the electric device 10, the electric component BC2 and the additional electric component BC3. Furthermore, the wired communicator WC1 is configured to receive signals from each other through the electric wiring structure WS using the PLC. Examples of the electric power source PS include a primary battery and a secondary battery. However, the electric power source PS is not limited to the present embodiment.

The PLC uses unique device identification (ID) that is assigned to an electric component such as the electric device 10 and the electric components BC2 and BC3. In the present embodiment, the memory CR2 is configured to store device information including unique device ID assigned to the electric device 10. Based on the unique device ID, the controller CR is configured to recognize signals which are necessary for itself among signals transmitted via the wired communication channel. For example, the controller CR is configured to generate signals including the device information indicating the communicator 120.

The controller CR is configured to recognize signals including other device information as signals transmitted from the electric component BC2 via the wired communication channel. The wired communicator WC1 is configured to separate input signals to a power source voltage and signals including device information. The wired communicator WC1 is configured to regulate the power source voltage to a level at which the communicator 120 can properly operate. The wired communicator WC1 is further configured to superimpose output signals such as signals including the device information on the power source voltage applied to the electric wiring structure WS from the electric power source PS.

The wireless communicator WC2 includes a signal transmitting circuit and a signal receiving circuit. The wireless communicator WC2 is configured to superimpose digital signals on carrier wave using a predetermined wireless communication protocol to wirelessly transmit the digital signal. In the present embodiment, the wireless communicator WC2 is configured to encrypt signals using a cryptographic key to generate encrypted wireless signals.

The wireless communicator WC2 is configured to receive and/or transmit a wireless signal via the wireless antenna 62. In the present embodiment, the wireless communicator WC2 is configured to decode the wireless signal to recognize signals and/or information wirelessly transmitted from another wireless communicator. The wireless communicator WC2 is configured to decrypt the wireless signal using the cryptographic key. The wireless communicator WC2 can also be referred to as a wireless communication circuit WC2.

The controller CR is configured to generate the control signal CS1 in response to the user input U1. The controller CR is configured to generate the control signal CS2 in response to the user input U2. The controller CR is configured to generate the control signal CS3 in response to the user input U3. The controller CR is configured to control the wired communicator WC1 to respectively transmit the control signals CS1, CS2, and CS3 via the wired communication channel in response to the user inputs U1, U2, and U3 if the controller CR selects the wired communicator WC1. The controller CR is configured to control the wireless communicator WC2 to respectively transmit the control signals CS1, CS2, and CS3 via the wireless communication channel in response to the user inputs U1, U2, and U3 if the controller CR selects the wireless communicator WC2.

Figure 17:
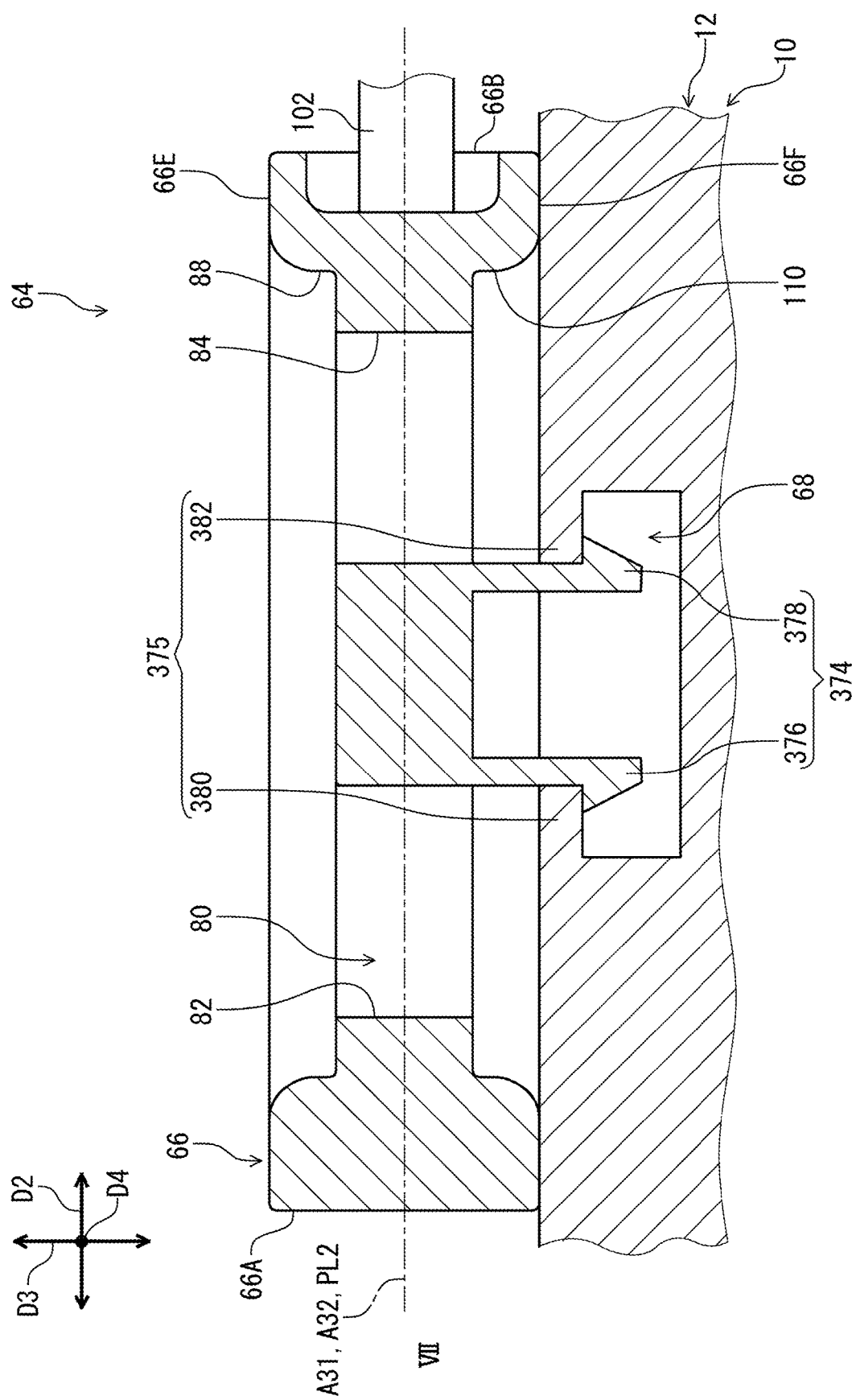
FIG. 17 is a cross-sectional view of an electric connector device in accordance with a modification.

As seen in FIG. 17, the coupling structure 68 can include other structures instead of or in addition to the coupling member 74. The coupling structure 68 can include an engagement member 374 instead of the coupling member 74. For example, the engagement member 374 is provided on the connector base 66 to be snap-fitted with an additional engagement member 375 of the additional device 10. The engagement member 374 extends from the connector base 66 in the predetermined direction D3. The engagement member 374 includes a first engagement part 376 and a second engagement part 378. The first engagement part 376 and the second engagement part 378 extend from the connector base 66 in the predetermined direction D3. The additional engagement member 375 includes a first additional engagement part 380 and a second additional engagement part 382. The first engagement part 376 is configured to be snap-fitted with the first additional engagement part 380. The second engagement part 378 is configured to be snap-fitted with the second additional engagement part 382.

The engagement member 374 is configured to be elastically deformable so as to be snap-fitted with the additional engagement member 375. The first engagement part 376 is configured to be elastically deformable so as to be snap-fitted with the first additional engagement part 380. The second engagement part 378 is configured to be elastically deformable so as to be snap-fitted with the second additional engagement part 382. For example, a tool is inserted into the first opening 82 and/or the second opening 84 to disengage the first engagement part 376 and the second engagement part 378 from the first additional engagement part 380 and the second additional engagement part 382.

The engagement member 374 is made of an elastically deformable material such as resin and rubber. The first engagement part 376 is made of an elastically deformable material such as resin and rubber. The second engagement part 378 is made of an elastically deformable material such as resin and rubber.

In FIG. 17, the first engagement part 376 and the second engagement part 378 are depicted as snap-fits. However, the engagement member 374 can have other structures such as a latch and a hook.

Figure 18:
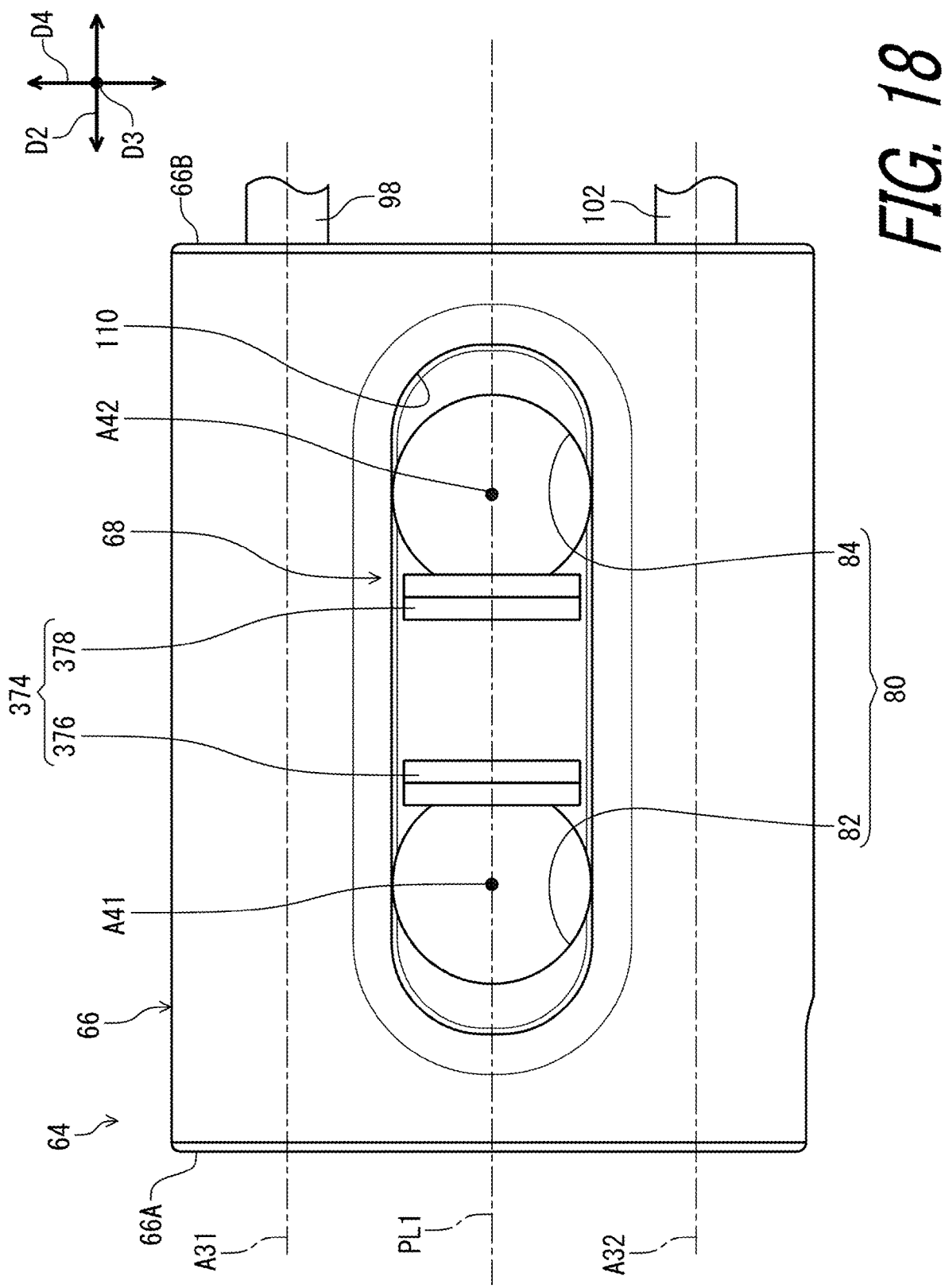
FIG. 18 is a side elevational view of the electric connector device illustrated in FIG. 17.

As seen in FIG. 18, the engagement member 374 (e.g., the first engagement part 376 and the second engagement part 378) is provided between the first center axis A31 and the second center axis A32 as viewed in the predetermined direction D3. The engagement member 374 (e.g., the first engagement part 376 and the second engagement part 378) is provided in the additional recess 110 as viewed in the predetermined direction D3.

Figure 19:
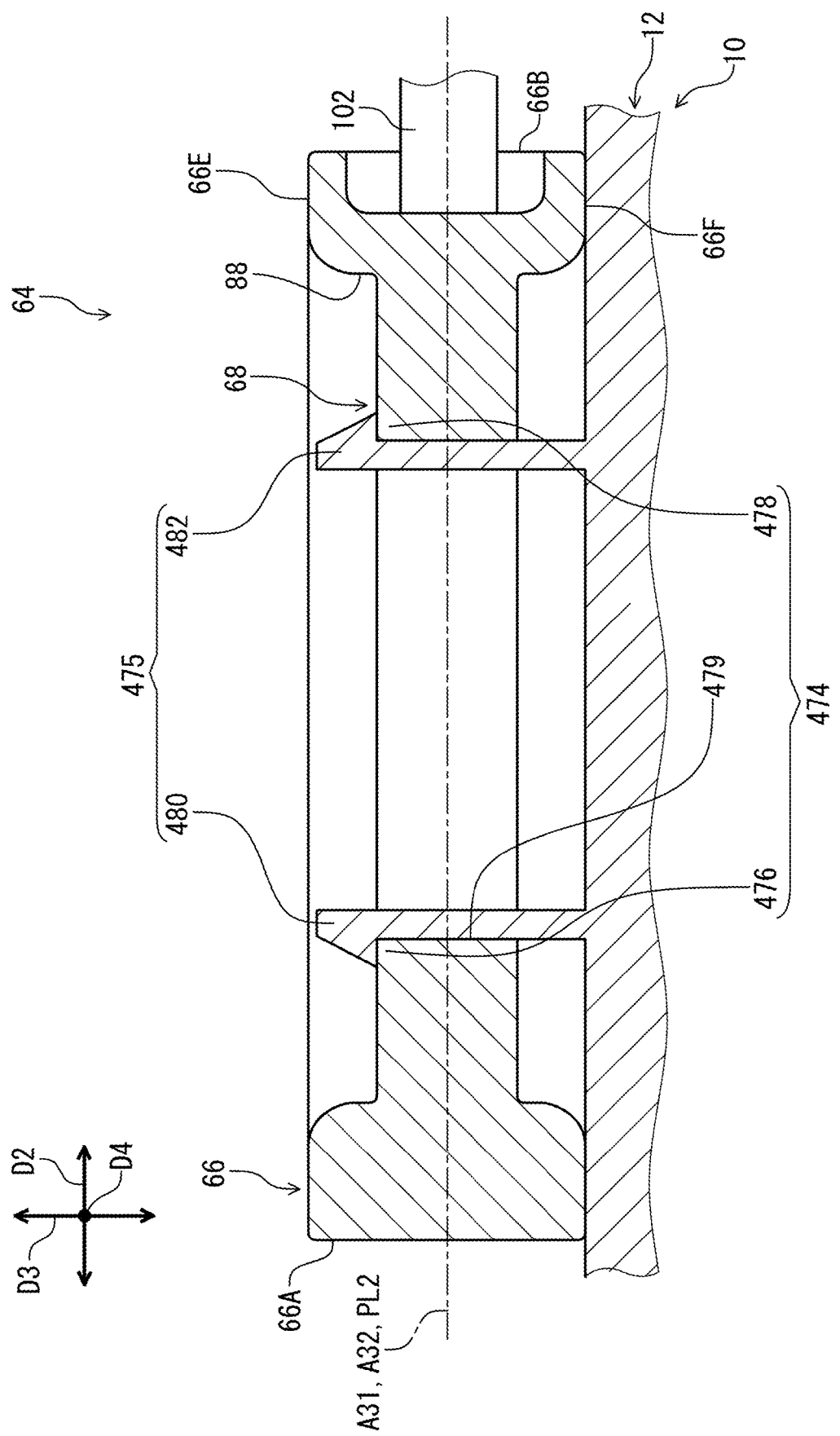
FIG. 19 is a cross-sectional view of an electric connector device in accordance with another modification.

In a modification shown in FIG. 19, the coupling structure 68 includes an engagement member 474 instead of the coupling member 74. For example, the engagement member 474 is provided on the connector base 66 to be snap-fitted with an additional engagement member 475 of the additional device 10. The engagement member 474 includes a first engagement part 476 and a second engagement part 478. The opening 80 is omitted from the connector base 66. Instead, the connector base 66 includes an attachment opening 479. The first engagement part 476 and the second engagement part 478 are provided on a periphery of the attachment opening 479.

The additional engagement member 475 extends from the base member 12 of the additional device 10 in the predetermined direction D3. The additional engagement member 475 includes a first additional engagement part 480 and a second additional engagement part 482. The first engagement part 476 and the second engagement part 478 extend from the base member 12 of the additional device 10 through the attachment opening 479 in the predetermined direction D3. The first engagement part 476 is configured to be snap-fitted with the first additional engagement part 480. The second engagement part 478 is configured to be snap-fitted with the second additional engagement part 482.

The additional engagement member 475 is configured to be elastically deformable so as to be snap-fitted with the engagement member 474. The first additional engagement part 480 is configured to be elastically deformable so as to be snap-fitted with the first engagement part 476. The second additional engagement part 482 is configured to be elastically deformable so as to be snap-fitted with the second engagement part 478. The user can disengage the first additional engagement part 480 and the second additional engagement part 482 from the first engagement part 476 and the second engagement part 478 by fingers.

The additional engagement member 475 is made of an elastically deformable material such as resin and rubber. The first additional engagement part 480 is made of an elastically deformable material such as resin and rubber. The second additional engagement part 482 is made of an elastically deformable material such as resin and rubber.

In FIG. 19, the first additional engagement part 480 and the second additional engagement part 482 are depicted as snap-fits. However, the additional engagement member 475 can have other structures such as a latch and a hook.

Figure 20:
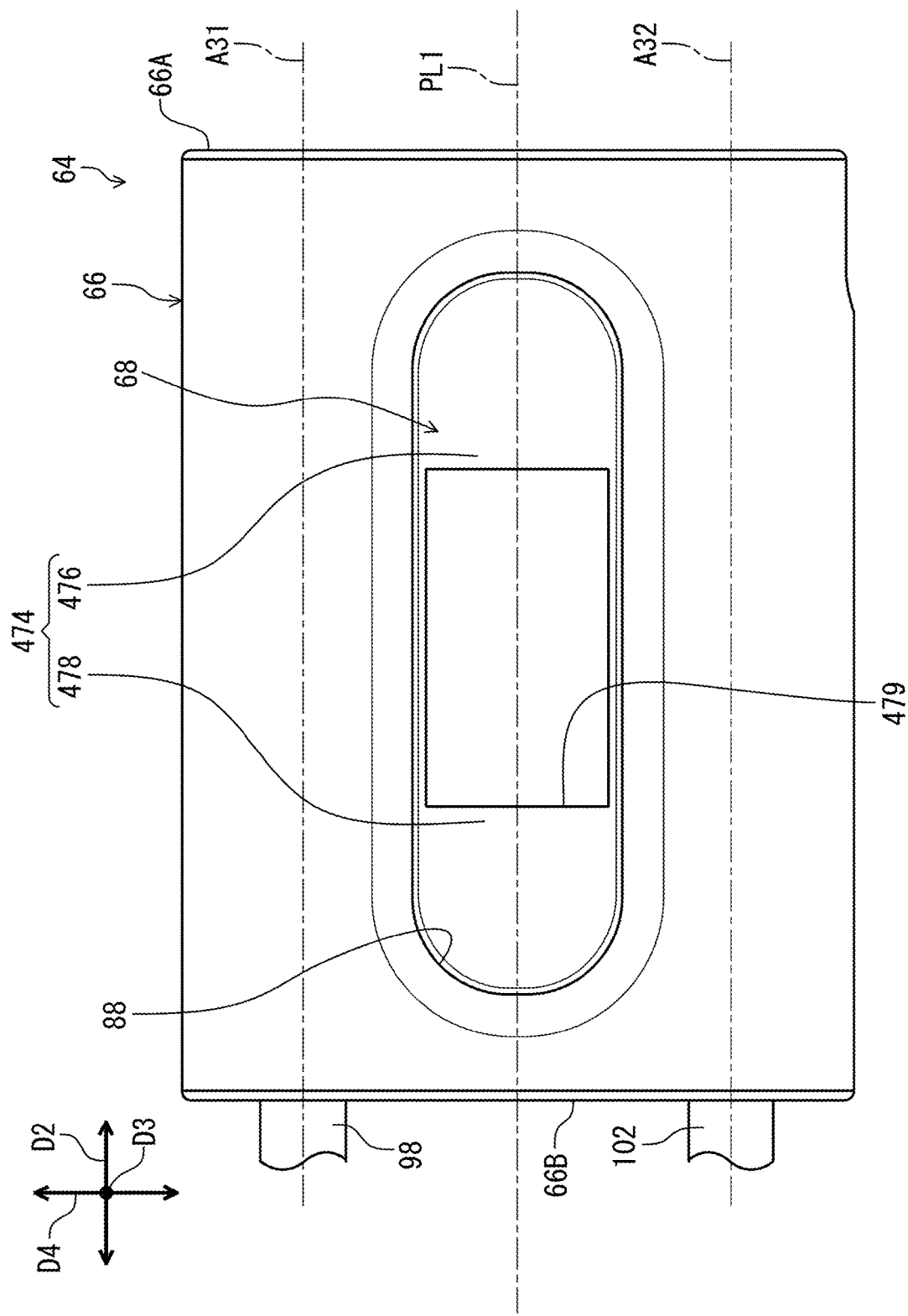
FIG. 20 is a side elevational view of the electric connector device illustrated in FIG. 19.

As seen in FIG. 20, the engagement member 474 (e.g., the first engagement part 476 and the second engagement part 478) is provided between the first center axis A31 and the second center axis A32 as viewed in the predetermined direction D3. The engagement member 474 (e.g., the first engagement part 476 and the second engagement part 478) is provided in the additional recess 110 as viewed in the predetermined direction D3.

Figure 21:
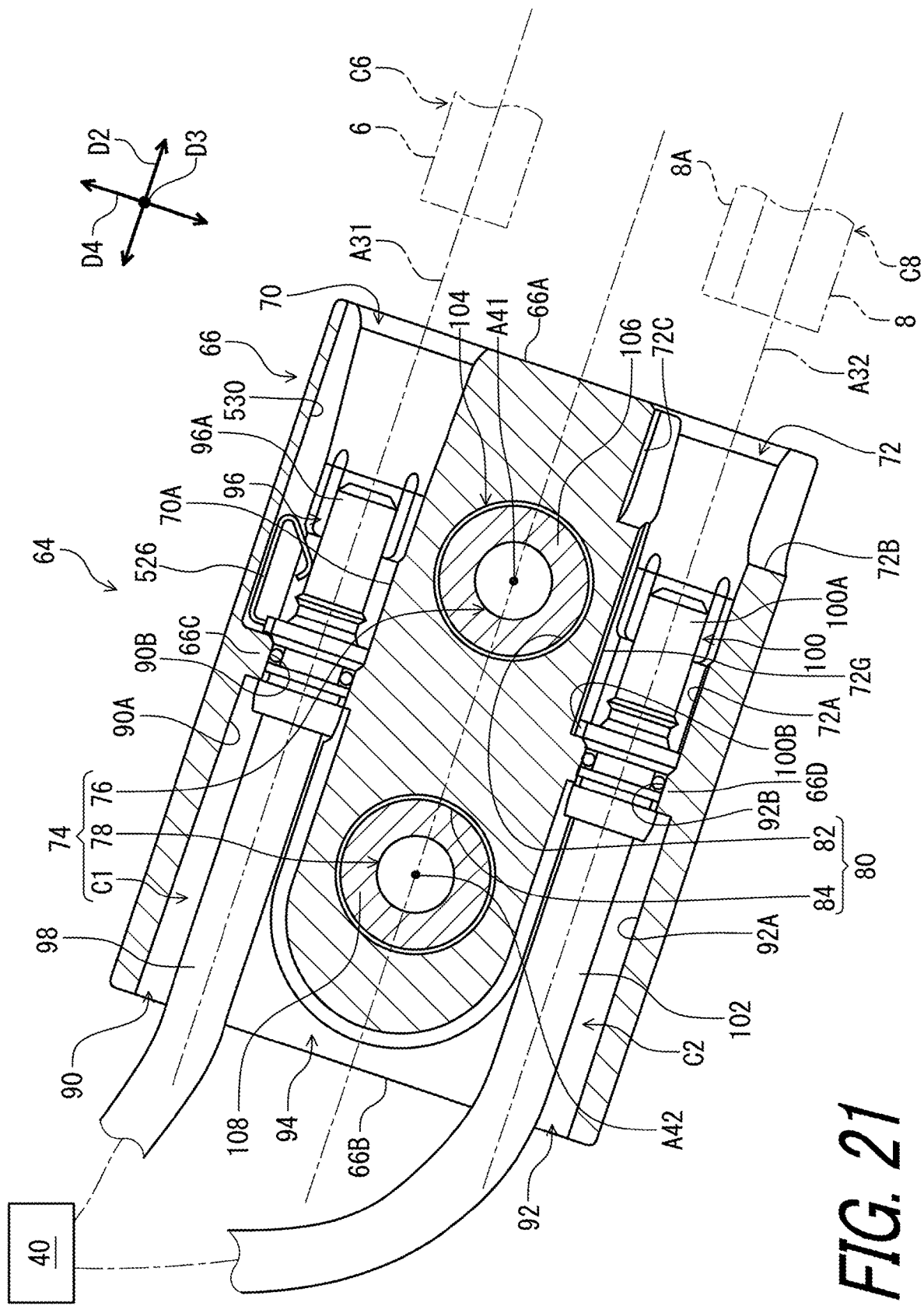
FIG. 21 is a cross-sectional view of an electric connector device in accordance with another modification.

In a modification shown in FIG. 21, the electric connector device 64 includes a reset terminal 526 mounted to the connector base 66. The reset terminal 526 is made of a metallic material and is elastically deformable. The reset terminal 526 is provided in the first connection port 70. The first connection port 70 includes an attachment groove 530. The reset terminal 526 is provided in the attachment groove 530. The reset terminal 526 is configured to be electrically connected to a reset line of the first control cable C6.

The reset terminal 526 is contactable with the first electric terminal provided on an outer peripheral surface of the first connector body 96A in a state where the first connector 6 of the first control cable C6 is not provided in the first connection port 70. The reset terminal 526 is not contactable with the first electric terminal provided on the outer peripheral surface of the first connector body 96A in a state where the first connector 6 of the first control cable C6 is provided in the first connection port 70. A part of the first connector 6 is provided between the reset terminal 526 and the first electric terminal provided on the outer peripheral surface of the first connector body 96A in the state where the first connector 6 of the first control cable C6 is provided in the first connection port 70.

For example, the controller CR is configured to detect contact between the reset terminal 526 and the first electric terminal provided on the outer peripheral surface of the first connector body 96A. The controller CR is configured to reset a system of the controller CR if the reset terminal 526 is in contact with the first electric terminal provided on the outer peripheral surface of the first connector body 96A. The reset terminal 526 can be provided to the second connection port 72 or both the first connection port 70 and the second connection port 72.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electric connector device for a human-powered vehicle, comprising:
   a connector base including
      a first connection port defining a first center axis, the first connection port being configured to receive a first cable directly from an outside of the connector base, and
      a second connection port defining a second center axis, the second center axis being spaced apart from the first center axis as viewed in a predetermined direction, the second connection port being configured to receive a second cable directly from the outside of the connector base; and
   a coupling structure configured to detachably attach the connector base to an additional device so that the connector base is non-movably attached to the additional device, the coupling structure being provided between the first center axis and the second center axis as viewed in the predetermined direction, wherein
   the coupling structure includes a coupling member configured to attach the connector base to the additional device, the coupling member being provided between the first center axis and the second center axis,
   the first connection port includes a first connection hole extending along the first center axis,
   the second connection port includes a second connection hole extending along the second center axis, and
   the coupling member extends directly between first connection hole and the second connection hole.

2. The electric connector device according to claim 1, wherein
   the coupling member being a separate member from the connector base.

3. The electric connector device according to claim 2, wherein
   the coupling member includes
      a first coupling member configured to detachably attach the connector base to the additional device, and
      a second coupling member configured to detachably attach the connector base to the additional device, the second coupling member being separate from the first coupling member, and
      at least one of the first coupling member and the second coupling member is provided between the first center axis and the second center axis as viewed in the predetermined direction.

4. The electric connector device according to claim 3, wherein
   both of the first coupling member and the second coupling member are provided between the first center axis and the second center axis as viewed in the predetermined direction.

5. The electric connector device according to claim 3, wherein
   at least one of the first coupling member and the second coupling member includes an external thread configured to be threadedly engaged with the additional device.

6. The electric connector device according to claim 3, wherein
   at least one of the first coupling member and the second coupling member extends in the predetermined direction.

7. The electric connector device according to claim 3, wherein
   the coupling structure includes an opening disposed on the connector base and provided between the first center axis and the second center axis as viewed in the predetermined direction, and
   the first coupling member and the second coupling member are configured to extend through the opening in an attaching state where the coupling member attaches the connector base to the additional device.

8. The electric connector device according to claim 7, wherein
   the additional device includes a protrusion to which the first coupling member and the second coupling member are coupled, and
   the protrusion is configured to extend through the opening in the attaching state.

9. The electric connector device according to claim 8, wherein
   the opening includes a first opening and a second opening, the protrusion includes
      a first protrusion configured to extend through the first opening in the attaching state, and
      a second protrusion configured to extend through the second opening in the attaching state, and
   the first coupling member and the second coupling member are coupled to the first protrusion and the second protrusion respectively in the attaching state.

10. The electric connector device according to claim 2, wherein
    the coupling structure includes an intermediate plate configured to be provided between the connector base and the coupling member.

11. The electric connector device according to claim 10, wherein
    the connector base includes a recess, and
    the intermediate plate is configured to be provided in the recess.

12. The electric connector device according to claim 11, wherein
    the recess extends along at least one of the first center axis and the second center axis as viewed in the predetermined direction.

13. The electric connector device according to claim 1, wherein
    the coupling structure includes an engagement member provided on the connector base to be snap-fitted with an additional engagement member of the additional device.

14. The electric connector device according to claim 13, wherein
    the engagement member is configured to be elastically deformable so as to be snap-fitted with the additional engagement member.

15. The electric connector device according to claim 1, wherein
    the first center axis is parallel to the second center axis as viewed in the predetermined direction.

16. The electric connector device according to claim 1, wherein
    at least one of the first center axis and the second center axis is perpendicular to the predetermined direction.

17. The electric connector device according to claim 1, wherein
    the coupling structure is at least partially physically provided between the first connection port and the second connection port.

18. The electric connector device according to claim 17, wherein
the coupling structure includes a coupling member configured to attach the connector base to the additional device, the coupling member being a separate member from the connector base, and
the coupling member is at least partially physically provided between a first attachment groove of the first connection port and a second attachment groove of the second connection port.

19. An electric connector device for a human-powered vehicle, comprising:
a connector base; and
a coupling structure configured to detachably attach the connector base to a base member of an additional device so that the connector base is non-movably attached to the additional device, the additional device including an operating member directly pivotally coupled to the base member, wherein
the connector base includes
a first connection port defining a first center axis, and
a second connection port defining a second center axis, wherein
the coupling structure includes a coupling member configured to attach the connector base to the additional device, the coupling member being provided between the first center axis and the second center axis,
the first connection port includes a first connection hole extending along the first center axis,
the second connection port includes a second connection hole extending along the second center axis, and
the coupling member extends directly between first connection hole and the second connection hole.

20. The electric connector device according to claim 19, wherein
the second center axis is spaced apart from the first center axis as viewed in a predetermined direction.

21. The electric connector device according to claim 19, wherein
the first connection port and the second connection port are each configured to receive an electric control cable.

22. An electric device for a human-powered vehicle, comprising:
a base member;
a movable member movably coupled to the base member;
circuitry having a first side and a second side provided on a reverse side of the first side, the circuitry being provided at one of the base member and the movable member;
a wireless antenna provided to the first side of the circuitry; and
a power-supply holder configured to accommodate a power supply, the power-supply holder being provided to accommodate the power supply on the first side of the circuitry in a predetermined range equal to or longer than 3 mm with respect to the wireless antenna.

23. The electric device according to claim 22, wherein
the base member extends in a longitudinal direction and includes
a first end portion configured to be coupled to a handlebar,
a second end portion opposite to the first end portion in the longitudinal direction, and
a grip portion provided between the first end portion and the second end portion,
the movable member is pivotally coupled to the base member about a pivot axis provided closer to the second end portion than to the first end portion, and
at least one of the wireless antenna and the power-supply holder is provided to the second end portion.

24. The electric device according to claim 22, wherein
the power-supply holder is configured to accommodate the power supply including at least one of a primary battery, a secondary battery, and a capacitor.

* * * * *